US012116128B2

(12) United States Patent
Baumgartner

(10) Patent No.: US 12,116,128 B2
(45) Date of Patent: Oct. 15, 2024

(54) WEAPON MOUNTABLE TACTICAL HEADS-UP DISPLAY SYSTEMS AND METHODS

(71) Applicant: KNIGHTWERX INC., Santa Barbara, CA (US)

(72) Inventor: Daniel Baumgartner, Santa Barbara, CA (US)

(73) Assignee: KNIGHTWERX INC., Montecito, CA (US)

( * ) Notice: Subject to any disclaimer, the term of this patent is extended or adjusted under 35 U.S.C. 154(b) by 0 days.

(21) Appl. No.: 18/504,553

(22) Filed: Nov. 8, 2023

(65) Prior Publication Data

US 2024/0076038 A1    Mar. 7, 2024

Related U.S. Application Data

(63) Continuation of application No. 17/456,985, filed on Nov. 30, 2021, now Pat. No. 11,840,335.
(Continued)

(51) Int. Cl.
*B64C 39/00* (2023.01)
*B64C 11/46* (2006.01)
(Continued)

(52) U.S. Cl.
CPC .......... *B64C 39/024* (2013.01); *B64C 11/46* (2013.01); *B64C 25/32* (2013.01); *B64C 29/02* (2013.01); *B64D 9/00* (2013.01); *B64D 17/80* (2013.01); *F41G 3/06* (2013.01); *F41G 3/08* (2013.01); *F41G 3/165* (2013.01); *G02B 23/10* (2013.01); *G05D 1/106* (2019.05); *G09G 3/001* (2013.01); *B64U 10/25* (2023.01); *B64U 50/13* (2023.01); *B64U 2201/00* (2023.01); *G09G 2320/0686* (2013.01)

(58) Field of Classification Search
CPC ....... B64C 39/024; B64C 11/46; B64C 25/32; B64C 29/02; G05D 1/106; B64D 9/00; B64D 17/80; F41G 3/06; F41G 3/08; F41G 3/165; G02B 23/10; G09G 3/001
USPC .......................................................... 345/7
See application file for complete search history.

(56) References Cited

U.S. PATENT DOCUMENTS 6,810,293 B1    10/2004  Chou
11,840,335 B2*  12/2023  Baumgartner ......... G05D 1/106
(Continued)

*Primary Examiner* — Daniel A Hess
(74) *Attorney, Agent, or Firm* — Haynes and Boone, LLP

(57) ABSTRACT

A tactical system includes a first HUD system mountable to a first weapon and a second HUD system mountable to a second weapon. The first HUD system includes sensors providing position and orientation data of the first weapon, a processor to calculate a target position based on the position and orientation data, and a communications module to communicate the target position over a network. The second HUD system includes sensors providing position and orientation data of the second weapon, a communications module configured to import the target position from the network, and a processor to: calculate a position and an orientation of the second weapon based on the position and orientation data of the second weapon; calculate a target vector based on the target position and the position of the second weapon; and generate a target finder visualization based on the target vector and the orientation of the second weapon.

20 Claims, 23 Drawing Sheets

Related U.S. Application Data

(60) Provisional application No. 63/215,305, filed on Jun. 25, 2021.

(51) Int. Cl.
*B64C 25/32* (2006.01)
*B64C 29/02* (2006.01)
*B64C 39/02* (2023.01)
*B64D 9/00* (2006.01)
*B64D 17/80* (2006.01)
*F41G 3/06* (2006.01)
*F41G 3/08* (2006.01)
*F41G 3/16* (2006.01)
*G02B 23/10* (2006.01)
*G05D 1/00* (2006.01)
*G09G 3/00* (2006.01)
*B64U 10/25* (2023.01)
*B64U 50/13* (2023.01)

(56) References Cited

U.S. PATENT DOCUMENTS

2021/0262758 A1    8/2021   Parker
2022/0326596 A1   10/2022   Legras

\* cited by examiner

WEAPON MOUNTABLE TACTICAL HEADS-UP DISPLAY SYSTEMS AND METHODS

CROSS-REFERENCE TO RELATED APPLICATIONS

This patent application is a continuation of U.S. patent application Ser. No. 17/456,985, filed Nov. 30, 2021, which claims priority to and the benefit of U.S. Provisional Application No. 63/215,305, filed on Jun. 25, 2021, and entitled "UNMANNED AERIAL VEHICLE AND CONTROL SYSTEMS AND METHODS," both of which are incorporated by reference herein in their entirety.

TECHNICAL FIELD

The present disclosure relates generally to weapon mounted accessories, and more specifically to systems and methods of a tactical heads-up display mountable to a weapon system.

BACKGROUND

Environmental forces such as wind speed, wind direction and other atmospherics (e.g., barometric pressure, temperature, humidity) can drastically affect the flight path of a projectile fired from a weapon system. The flight path can be affected by highly complex wind conditions in which inconsistent wind speeds, wind directions and other atmospherics make precision landing and/or placement difficult. Supplemental devices may be used to gather environmental data and calculate ballistic solutions based on the gathered data. It may be difficult for a shooter to see or reference the calculated ballistic solutions when in a shooting position.

It is therefore desirable to provide improved systems and methods that address at least in part the above described problems and/or which more generally offers improvements or an alternative to existing arrangements.

SUMMARY

According to embodiments of the present disclosure, a heads-up display (HUD) mountable to a weapon system is provided. The HUD may include a 9 degrees of freedom (9DOF) sensor, a target library, and a target finder visualization. The target library may store respective ballistic information for each target of a plurality of targets. The respective ballistic information may include a target vector for each target of the plurality of targets. The target vector may be calculated based on data received from the 9DOF sensor. The target finder visualization may allow a shooter to locate a selected target of the plurality of targets. The target finder visualization may be based on the target vector.

According to embodiments of the present disclosure, a system is provided. The system may include a weapon system and a heads-up display (HUD) mounted to the weapon system. The HUD may include a 9 degrees of freedom (9DOF) sensor, a target library storing respective ballistic information for each target of a plurality of targets, and a target finder visualization. The respective ballistic information may include a target vector for each target of the plurality of targets. The target vector may be calculated based on data received from the 9DOF sensor. The target finder visualization may allow a shooter to locate a selected target of the plurality of targets. The target finder visualization may be based on the target vector.

According to embodiments of the present disclosure, a method is provided. The method may include determining, using a 9 degrees of freedom (9DOF) sensor of a heads-up display (HUD) mounted to a weapon system, an X-Y-Z orientation for each target of a plurality of targets. The method may include storing, in a target library of the HUD, respective ballistic information for each target of the plurality of targets, the respective ballistic information including a target vector for each target of the plurality of targets, the target vector based on the determined X-Y-Z orientation. The method may include displaying, in the HUD, at least a portion of the respective ballistic information and a target finder visualization, the target finder visualization based on the target vector and pointing to a selected target of the plurality of targets.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the present disclosure and should not be construed as a complete depiction of the scope of the present disclosure.

Embodiments of the disclosure and their advantages are best understood by referring to the detailed description that follows. It should be appreciated that like reference numerals may be used to identify like elements illustrated in one or more of the figures.

DETAILED DESCRIPTION

According to the present disclosure, systems and methods are provided for a weapon mountable heads-up display (HUD) that provides real-time ballistic firing solutions within a field-of-view of a shooter. Weapon system operators, such as a Special Operations Forces sniper, can be faced with a dynamic battlefield and rapidly evolving enemy technology. The HUD may provide real-time information to the operator's non-shooting eye for rapid engagement of multiple targets. The HUD may serve as an intuitive live data display that compiles environmental and ballistic data and offer to the shooter quick visual access (e.g., to the non-shooting eye) to all necessary parameters. The HUD may use an internal 9 degrees of freedom sensor and combine the sensor data with GPS positioning data to define a weapon vector in relative 3D-space. Each target in a ballistic target library may receive a respective target vector that allows the shooter to locate previously lasered/marked targets simply via an intuitive quick target finder visualization on the HUD display. These and other features described herein may allow the shooter to quickly switch between multiple targets (e.g., through a fully zoomed-in scope), offering to the shooter an animated live arrow or other target finder visualization leading the shooter to a chosen target from the target list, thereby allowing the shooter to leave the scope untouched during this procedure.

Figure 1:
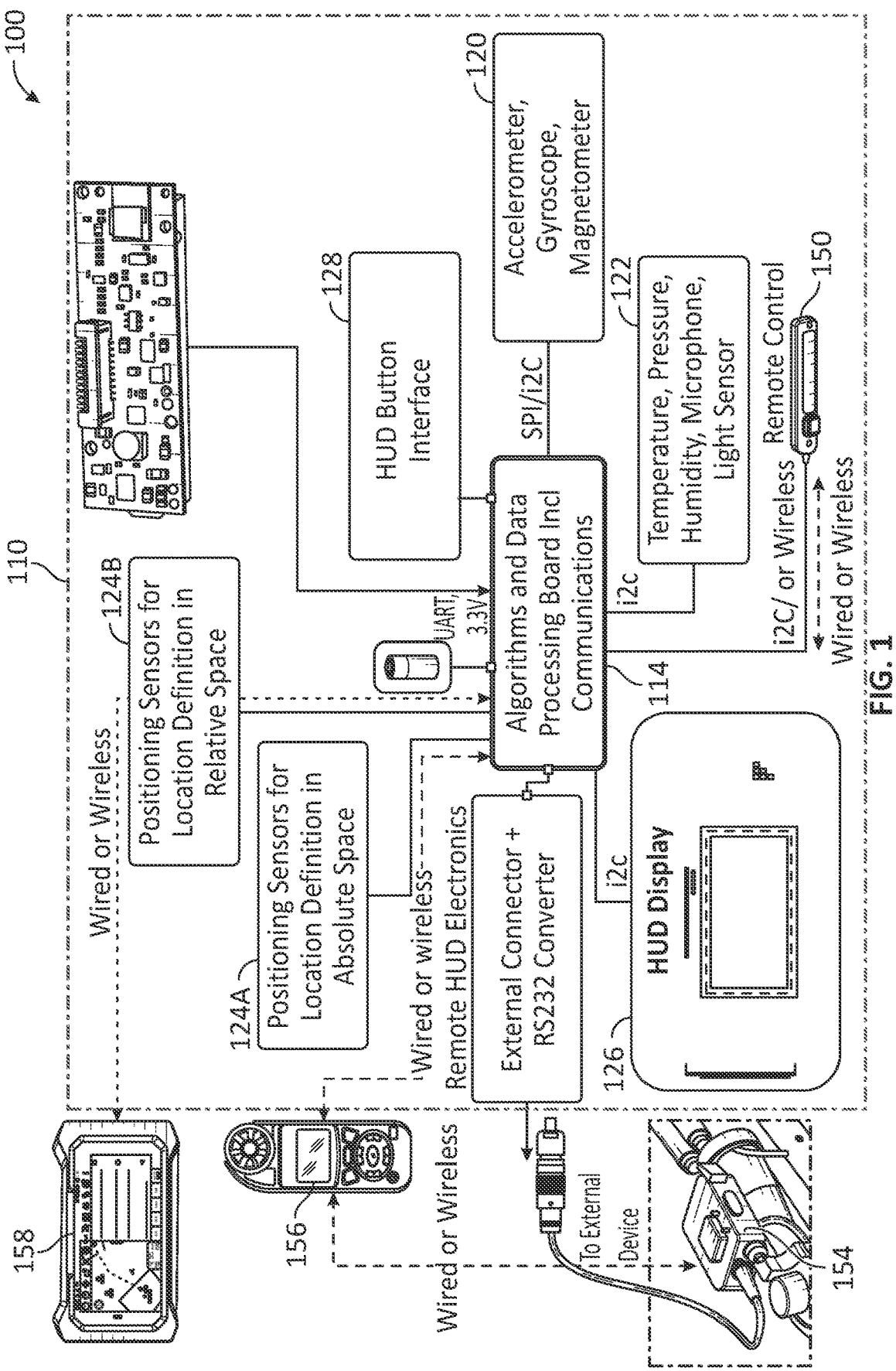
FIG. 1 illustrates a schematic view of a tactical system, in accordance with an embodiment of the disclosure.

FIG. 1 illustrates a schematic view of a tactical system 100, in accordance with an embodiment of the disclosure. As described herein, the tactical system 100 may present information (e.g., real-time ballistics information) to a shooter's non-shooting eye, such as for rapid engagement of one or more (e.g., multiple) targets. The tactical system 100 may include an intuitive live data display that compiles environmental and ballistic data (e.g., from an external device, from internal sensors, etc.) and offers to the operator quick visual access to all necessary parameters. As described in detail below, the tactical system 100 may include any combination of internal and external sensors/devices to define a weapon system (e.g., sniper rifle) vector in relative 3D-space. Each target in a ballistic target library or target list may be assigned a respective target vector that allows the operator to locate previously marked targets simply via an intuitive quick target finder visualization of a heads-up display (HUD) 110. As a result, the HUD 110 may provide an animated/dynamic target finder visualization (e.g., live arrow) that leads the operator to a selected target from the target list, allowing the operator to switch targets while leaving the scope untouched during the procedure. Except as otherwise noted herein, the HUD 110 may be similar to the coordinators disclosed in U.S. application Ser. No. 16/822,925, now U.S. Pat. No. 10,866,065 and/or U.S. patent application Ser. No. 17/099,592, the disclosures of which are hereby incorporated by reference in their entireties for all purposes.

Referring to FIG. 1, the HUD 110 may include a logic device 114 and one or more connected sensors, controls, displays, connectors, or devices. As shown, the HUD 110 may include a 9 degrees of freedom (9DOF) sensor 120, an environmental sensor 122, one or more positioning sensors 124, a display 126, and one or more user controls 128 connected to logic device 114. The 9DOF sensor 120 includes a gyroscope, an accelerometer, and a magnetometer allowing the 9DOF sensor 120 to capture nine distinct types of motion or orientation-related data: 3 degrees each of acceleration, magnetic orientation, and angular velocity. The environmental sensor 122 may detect one or more environmental conditions, such as temperature, pressure, and/or humidity. In embodiments, the environmental sensor 122 may also detect light and sound. The one or more positioning sensors 124 may include first positioning sensors 124A for location definition of the HUD 110 in absolute space and second positioning sensors 124B for location definition in relative space.

Logic device 114 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 114 is configured to interface and communicate with the various components of HUD 110 to perform various methods and processing steps described herein. In various embodiments, processing instructions may be integrated in software and/or hardware as part of logic device 114, or code (e.g., software and/or configuration data) which may be stored in memory and/or a machine readable medium. In various embodiments, the instructions stored in memory and/or machine-readable medium permit logic device 114 to perform the various operations discussed herein and/or control various components of HUD 110 for such operations.

Memory may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory. Machine-readable medium (e.g., a memory, a hard drive, a compact disk, a digital video disk, or a flash memory) may be a non-transitory machine-readable medium storing instructions for execution by logic device 114. In various embodiments, machine-readable medium may be included as part of HUD 110 and/or separate from HUD 110, with stored instructions provided to HUD 110 by coupling the machine-readable medium to HUD 110 and/or by HUD 110 downloading (e.g., via a wired or wireless link) the instructions from the machine-readable medium (e.g., containing the non-transitory information).

Logic device 114 may be configured to calculate ballistic solutions based on received data and/or display the ballistic solutions for viewing by a user (e.g., a sniper, operator, etc.). Display 126 may include a display device such as a liquid crystal display (LCD), an organic light-emitting diode (OLED) display, and/or other types of displays as appropriate to display images and/or information to the user of HUD 110. Logic device 114 may be configured to display images and information on display 126. For example, logic device 114 may be configured to retrieve images and information from memory and provide images and information to display for presentation to the user of HUD 110. Display 126 may include display electronics, which may be utilized by logic device 114 to display such images and information.

User controls 128 may include any desired type of user input and/or interface device having one or more user actuated components, such as one or more buttons, slide bars, knobs, keyboards, joysticks, and/or other types of controls that are configured to generate one or more user actuated input control signals. In some embodiments, user controls 128 may be integrated with display 126 as a touchscreen to operate as both user controls and display. Logic device 114 may be configured to sense control input signals from user controls 128 and respond to sensed control input signals received therefrom. In some embodiments, portions of display 126 and/or user controls 128 may be implemented by appropriate portions of a tablet, a laptop computer, a desktop computer, and/or other types of devices. In various embodiments, user controls 128 may be configured to include one or more other user-activated mechanisms to provide various other control operations of HUD 110, such as auto-focus, menu enable and selection, field of view (FoV), brightness, contrast, gain, offset, spatial, temporal, and/or various other features and/or parameters. In embodiments, a remote (wired or wireless) 150 may be configured to control an operation of the HUD 110, such as to provide an indication of on or off target, as detailed below.

Logic device 114 may communicate with one or more external devices (e.g., remote systems), such as through a communication interface (e.g., through wired and/or wireless communications). In this regard, logic device 114 may communicate with the external device(s) via a wired communication over a cable/connector and/or a wireless communication over an antenna. For example, logic device 114 may include one or more wired or wireless communication components, such as an Ethernet connection, a wireless local area network (WLAN) component, a wireless broadband component, mobile cellular component, a wireless satellite component, or various other types of wireless communication components including radio frequency (RF), microwave frequency (MWF), and/or infrared frequency (IRF) components configured for communication with a network. In other embodiments, logic device 114 may be configured to interface with a DSL (e.g., Digital Subscriber Line) modem, a PSTN (Public Switched Telephone Network) modem, an Ethernet device, and/or various other types of wired and/or wireless network communication devices configured for communication with a network. Examples of external devices include a laser range finder 154, a wind data source 156, a ballistic computer, a control station (e.g., a computer) 158, or the like, or any combination thereof.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, HUD 110 and/or its individual associated components may be associated with a particular network link such as for example a URL (Uniform Resource Locator), an IP (Internet Protocol) address, and/or a mobile phone number.

Figure 2:
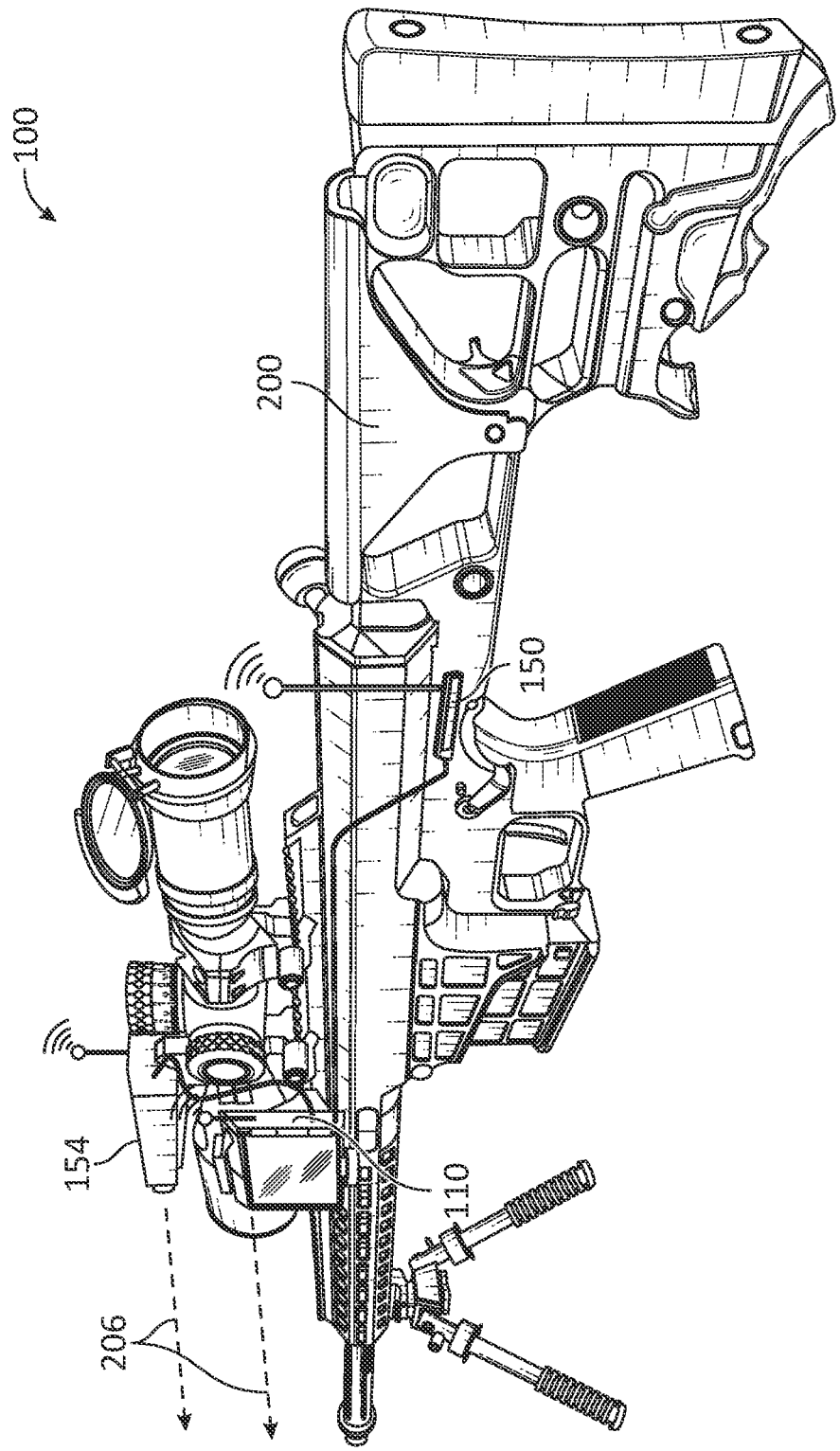
FIG. 2 illustrates the tactical system, including a heads-up display (HUD), mounted at least partially to a weapon system, in accordance with an embodiment of the disclosure.

FIG. 2 illustrates tactical system 100 mounted at least partially to a weapon system 200, in accordance with an embodiment of the disclosure. In the illustrative embodiment of FIG. 2, tactical system 100 includes HUD 110, laser range finder 154, and remote 150 mounted to weapon system 200, although other configurations are contemplated. HUD 110 may be mounted to a picatinny rail of weapon system 200, such that HUD 110 is mounted within a line of sight of a shooter (e.g., to the left of a scope, to the right of the scope, etc.). As shown, laser range finder 154 may be mounted to the scope of weapon system 200, and remote 150 may be mounted adjacent to grip, although other configurations are contemplated. Although weapon system 200 is illustrated as a rifle system (e.g., a MK22 Advanced Sniper Rifle weapon system), other configurations are contemplated. For example, the weapon system 200 may be a handgun system, a mortaring system, an artillery system, or other weapon system.

Laser range finder 154 may be a ranging device configured to provide a range to target 206. The laser range finder 154, which may be referred to as an LRF, may be operable to provide range to target information to HUD 110, such as via wired and/or wireless communication. Depending on the application, the laser range finder 154 may be a third-party device, in which case the laser range finder 154 is mounted to weapon system 200 (e.g., the scope as illustrated), or laser range finder 154 may be integrated into HUD 110, such that range to target information is obtained directly via HUD 110. In this manner, a separate laser range finder is not needed. In embodiments, both HUD 110 and an external ranging device may obtain range to target data, such as for redundancy, data confirmation, improved accuracy, or the like.

For right-handed shooters, the HUD 110 may be mounted on the left side of weapon system 200 such that display of information on HUD 110 is visible via the shooter's non-shooting eye. For left-handed shooters, the HUD 110 may be mounted on the right side of the weapon system 200 for similar purposes. As a result, both the HUD 110 and the scope view may be visible to the shooter simultaneously or near simultaneously. The remote 150 may be mounted in a position facilitating shooter operation of remote 150 without unnecessary movement by the shooter. For example, the remote 150 may be positioned for operation while the shooter is in proper shooting position (i.e., without shooter movement once in position). As shown, remote 150 may communicate with HUD 110 via wired and/or wireless communication.

Figure 3:
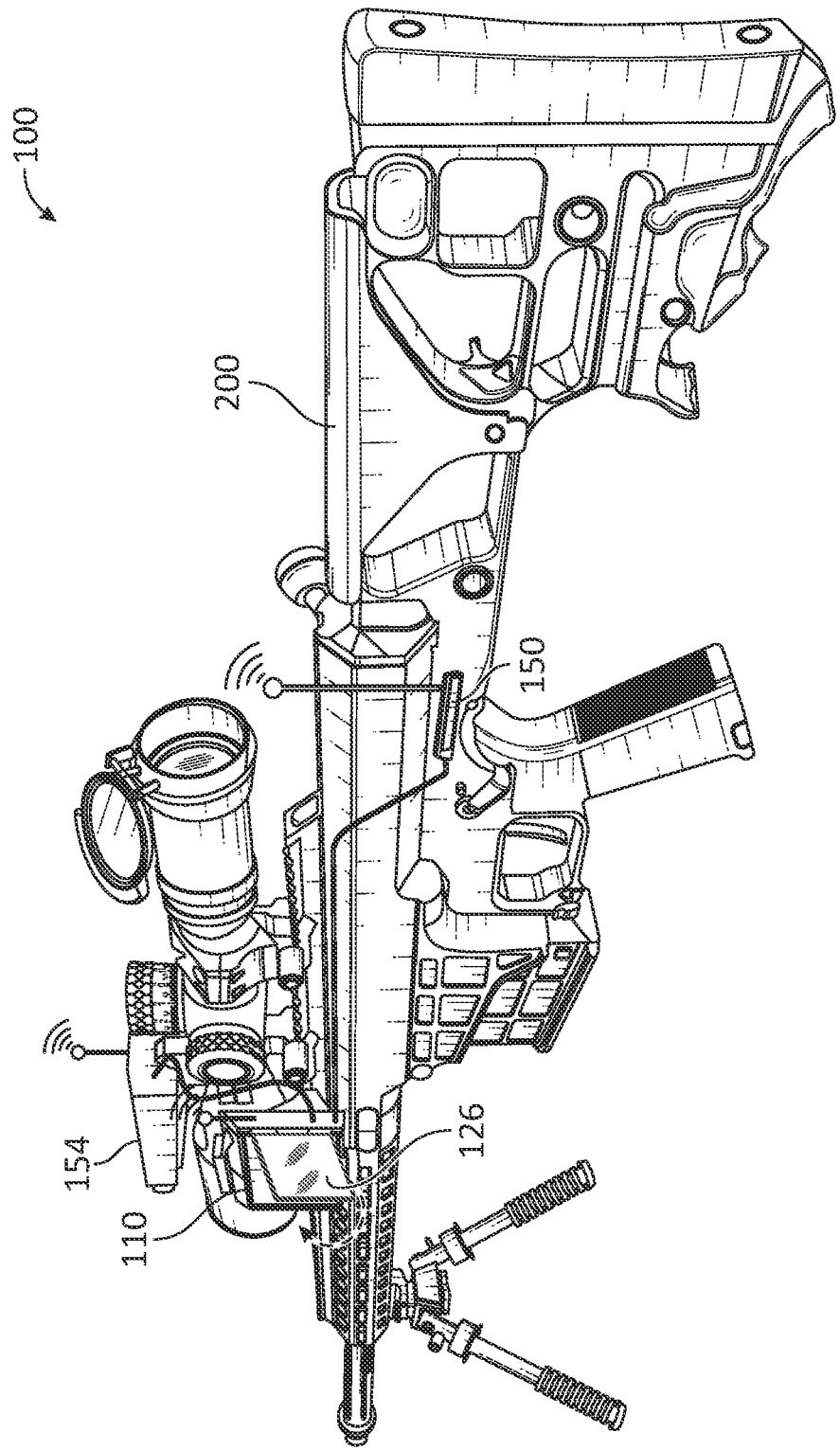
FIG. 3 illustrates the HUD in a second configuration, in accordance with an embodiment of the disclosure.

FIG. 3 illustrates HUD 110 in a second configuration, in accordance with an embodiment of the disclosure. In embodiments, the display 126 may be foldable. In such embodiments, the display 126 may be moved between a first, stored position (see FIG. 2) and a second, use position (see FIG. 3). Referring to FIG. 2, the first, stored position may fold the display 126 into a body of the HUD 110 for compactness (e.g., for storage, transport, etc.). Referring to FIG. 3, the second, use position may unfold the display 126 away from the body of the HUD 110 for improved viewing of display 126 by the shooter. In the second, use position, the display 126 may rotate up and down (e.g., for height/angle adjustment) based on shooter preference, such as to adjust display 126 for a best viewing angle by shooter. Movement of display 126 may turn HUD 110 on or off. For instance, folding display 126 into the first, stored position may turn HUD 110 off. Unfolding the display 126 to the second, use position may turn the HUD 110 on.

Figure 4:
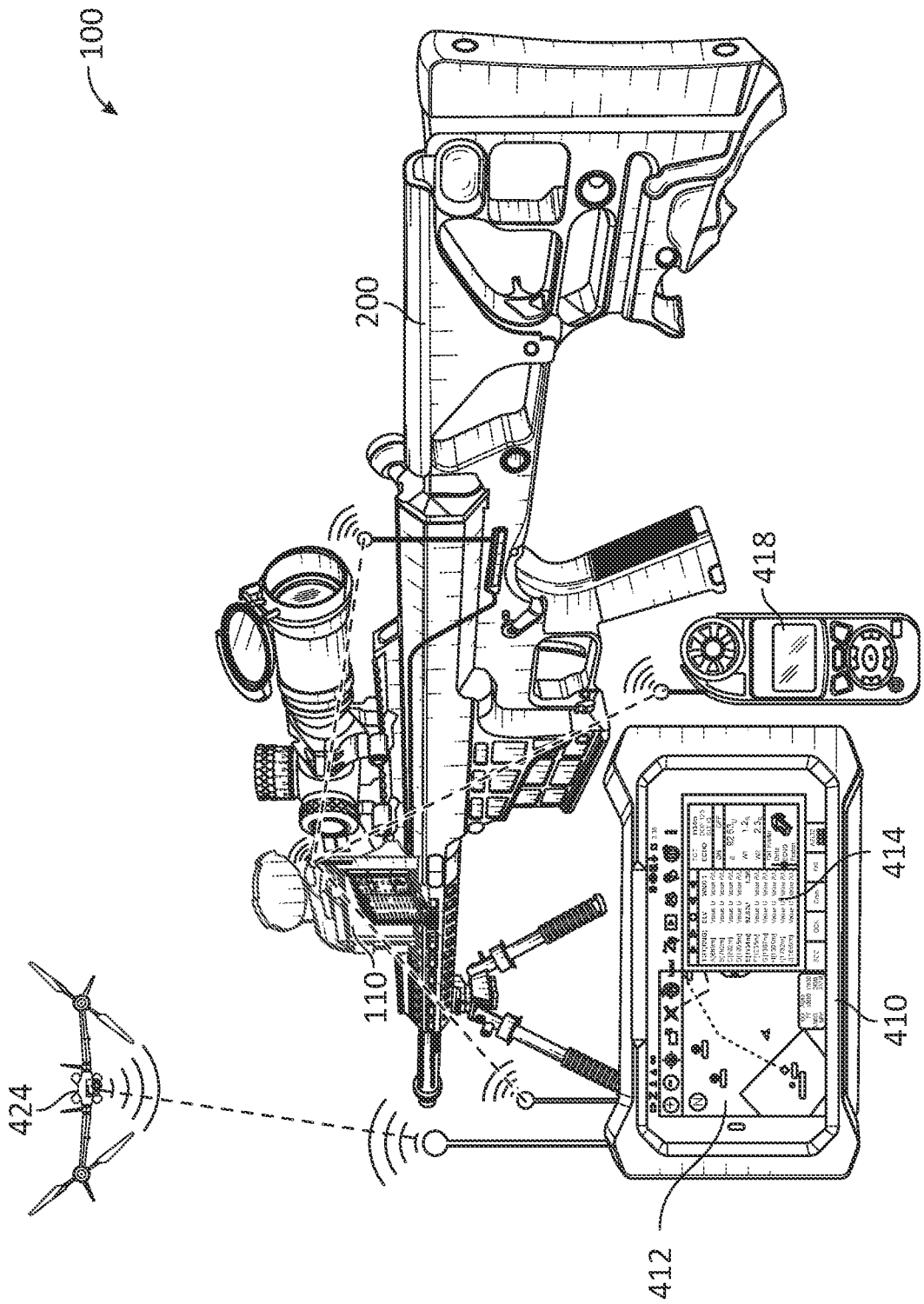
FIG. 4 illustrates the tactical system in communication with one or more third-party devices, in accordance with an embodiment of the disclosure.

FIG. 4 illustrates tactical system 100 in communication with one or more external (e.g., third-party) devices supporting system operation, in accordance with an embodiment of the disclosure. Depending on the application, tactical system 100 may be in wired or wireless communication with a wind sensor, a ballistic computer, a control station, an airborne device (e.g., an unmanned aerial vehicle (UAV)), or any combination thereof. For example, tactical system 100 may include a team awareness kit or tactical assault kit (TAK) 410. TAK 410 may be a geospatial infrastructure and military situation awareness application, such as for precision targeting, situational awareness, surrounding land formation intelligence, navigation, and data sharing. Depending on the application, TAK 410 may be configured for an Android operating system (e.g., ATAK) or any other operating system on a smartphone or other external computer. As shown, TAK 410 may provide a map view 412 and a target view 414. Map view 412 may provide on overhead view of shooter's position, target position, ally position, enemy position, and the like. Target view 414 may provide a list of marked targets and ballistic data for each target, as detailed below. In embodiments, target view 414 may also be displayed on HUD 110 for shooter use.

In embodiments, HUD 110 may sync with TAK 410 (and/or other connected devices) to import and/or export target data. For example, HUD 110 may initiate a constant, near-constant, or semi-constant synchronization loop with TAK 410 to import/export pre-defined target vectors, target characters, and target positions and allow to project their location in 3D-space on HUD 110 (e.g., display 126, a target arrow indicator, etc.). In embodiments, target location data may be sent from TAK 410 or other command center to HUD 110, where the target location data is saved in a target database and then illustrated/selectable via a quick target finder arrow, as detailed below. For example, prior to a sniper's arrival at a shooting position, target coordinates may already be known (e.g., TGT ALPHA is at coordinate X/Y and altitude A). Once at the shooting position, the sniper may activate TAK 410 and HUD 110 may download and save (e.g., automatically) the target coordinates (e.g., the TGT ALPHA coordinates). To find a known target quickly (e.g., TGT ALPHA), HUD 110 may calculate the vector from the shooting position to the target, such as via GPS, 9DOF sensor 120, an altitude sensor, or other sensors. As explained below, HUD 110 may illustrate a direction to the known target from the sniper's viewpoint (e.g., via a target finder arrow). For example, HUD 110 may allow to combine incoming/external target parameters with the HUD's own sensor data to aggregate the data to a live target vector on display 126.

In some embodiments, tactical system 100 may include a handheld wind sensor 418. Handheld wind sensor 418 may provide real-time ballistics, wind and atmospherics data for display on HUD 110 and/or TAK 410. For example, handheld wind sensor 418 may include a ballistics computer configured to calculate a ballistic solution for a target, such as any of the targets marked in HUD 110 or TAK 410. In embodiments, the ballistics computer may be integrated in other components of handheld system, such as in HUD 110 or TAK 410. In such embodiments, handheld wind sensor 418 may provide real-time wind and atmospherics data only.

With continued reference to FIG. 4, tactical system 100 may include other devices, such as an unmanned aerial vehicle (UAV) 424 or another airborne device. UAV 424 may be similar to the UAV described in U.S. Patent Application No. 63/215,305, filed on Jun. 25, 2021 and entitled "UNMANNED AERIAL VEHICLE AND CONTROL SYSTEMS AND METHODS," the disclosure of which is hereby incorporated by reference. For example, UAV 424 may provide real-time wind and atmospherics data for use in calculating a ballistics solution to a target, among other uses as described in U.S. Patent Application No. 63/215,305. For instance, UAV 424 may gather wind data along a flight path of a projectile to a target.

Figure 5:
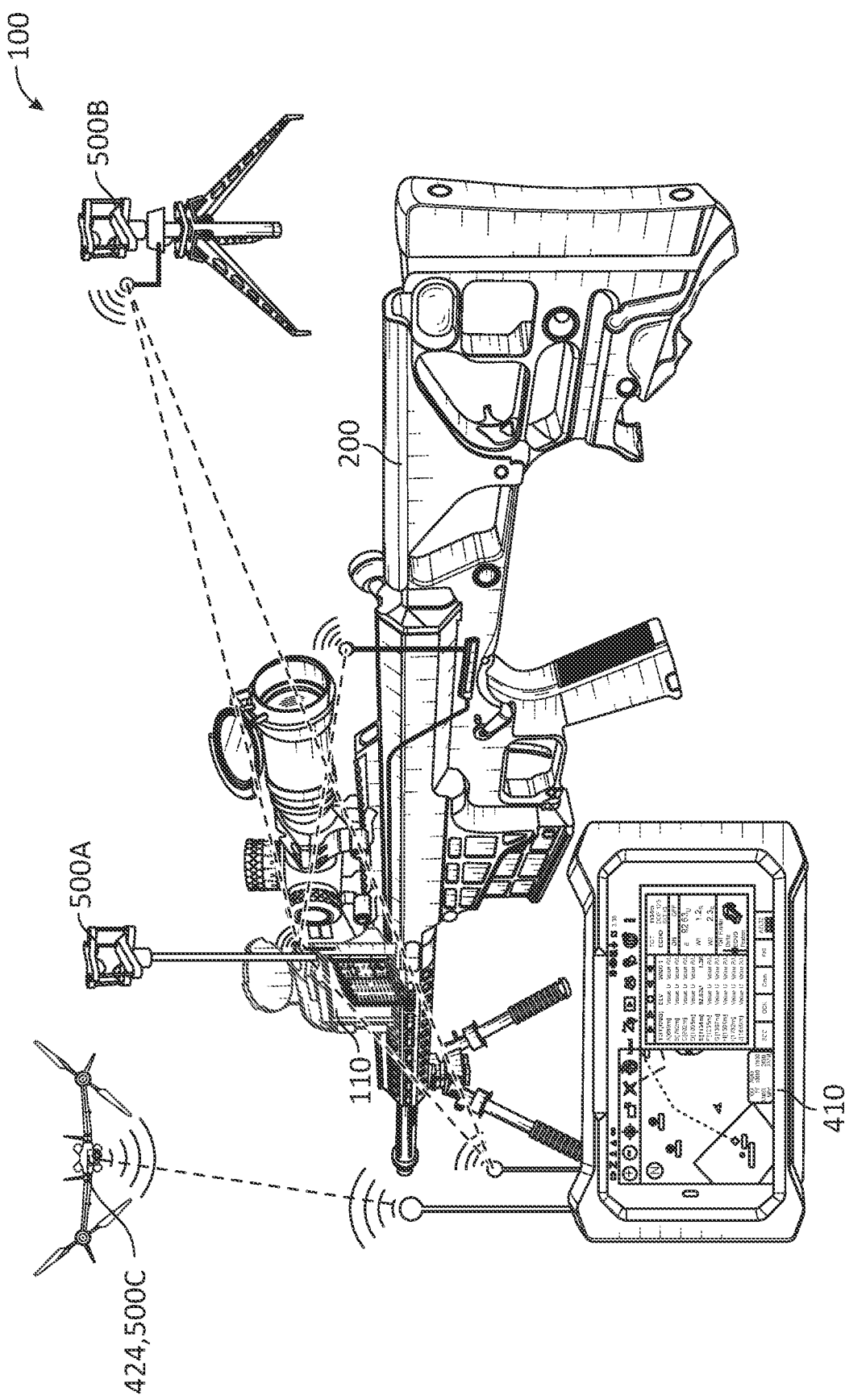
FIG. 5 illustrates the tactical system in communication with one or more wind and atmospherics sensors, in accordance with an embodiment of the disclosure.

FIG. 5 illustrates tactical system 100 in communication with one or more wind and atmospherics sensors (hereinafter "environmental sensors" 500), in accordance with an embodiment of the disclosure. Referring to FIG. 5, the environmental sensors 500 may be wired or wirelessly connected to HUD 110 and/or TAK 410 as real-time ballistics, wind and atmospherics data sources. The environmental sensors 500 may be weapon mounted, HUD-integrated, detachable, and/or static. For example, a first environmental sensor 500A may be weapon mounted or coupled to HUD 110. A second environmental sensor 500B may be a ground sensor placeable at a desired location in the field. As shown, UAV 424 may function as a third environmental sensor 500C. In embodiments, one or more of the environmental sensors 500 may be similar to the sensors described in U.S. patent application Ser. No. 16/822,925, now U.S. Pat. No. 10,866,065, the disclosure of which is hereby incorporated by reference in its entirety.

Figure 6:
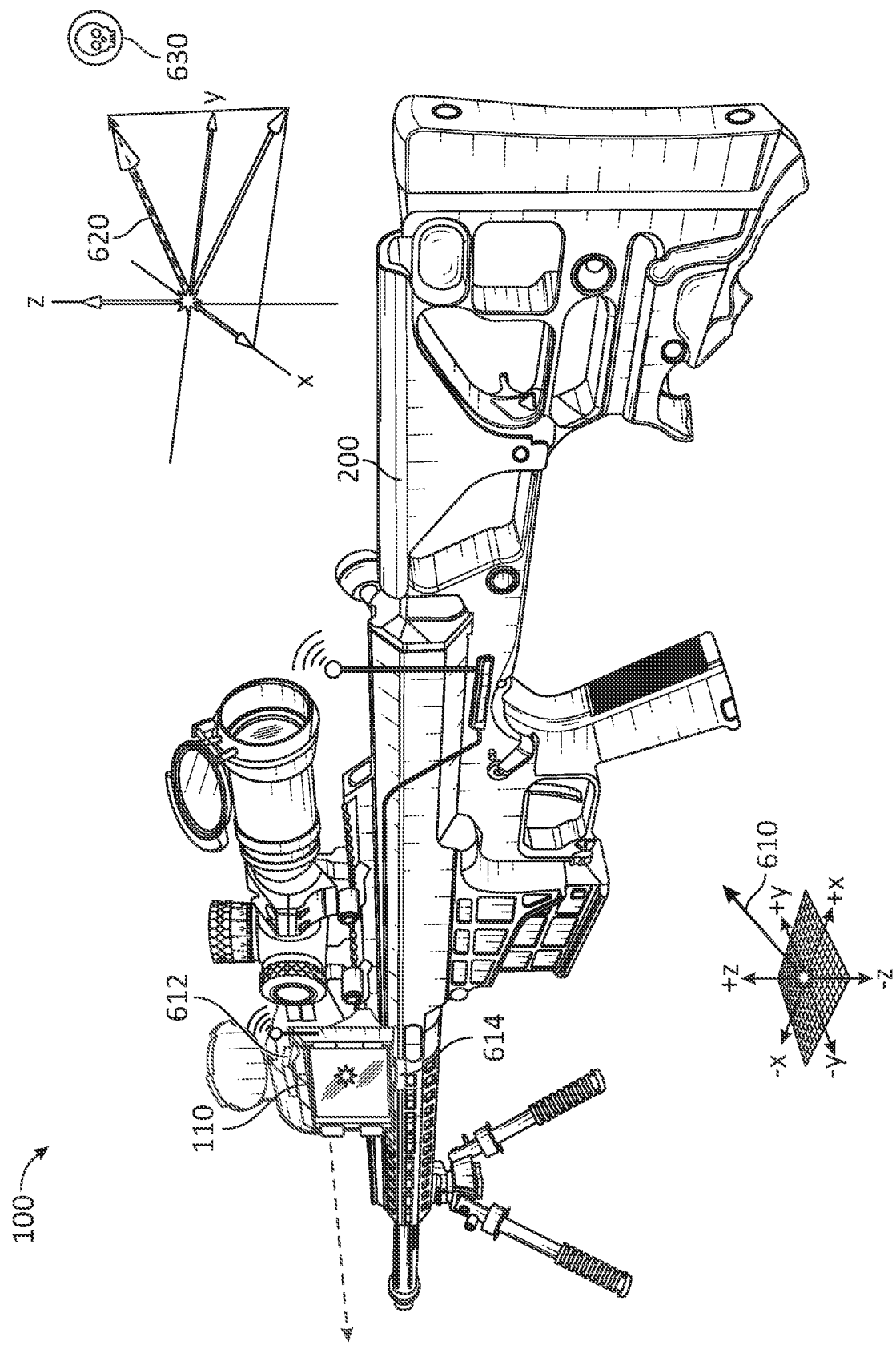
FIG. 6 illustrates the tactical system defining a weapon location in space, in accordance with an embodiment of the disclosure.

FIG. 6 illustrates tactical system 100 defining a weapon location in space, in accordance with an embodiment of the disclosure. Referring to FIG. 6, HUD 110 may include one or more sensors operable to define a location and/or orientation of weapon system 200. For example, 9DOF sensor 120 may define X, Y, and Z components of a weapon vector 610 defining the orientation of weapon system 200. In embodiments, system may include a first weapon location sensor 612 to define weapon location in relative space, such as GPS latitude/longitude. As shown, first weapon location sensor 612 may be provided in HUD 110, although other configurations are contemplated, including first weapon location sensor 612 provided in laser range finder 154. In some embodiments, system may include a second weapon location sensor 614 to define weapon location in absolute space, such as in GPS-denied environments. The second weapon location sensor 614 may include computer vision, LIDAR, ultrasound, artificial intelligence (AI) algorithms, and/or other components or systems to define weapon location.

As shown, a target vector 620 (e.g., a 3D-space target location vector) may be defined based on range to target 206 and data from the 9DOF sensor 120 and weapon location sensor(s) (e.g., the first weapon location sensor 612 and/or the second weapon location sensor 614). For example, the target vector 620 may be defined based on gathered sensor data from 9DOF sensor 120, weapon location sensor(s), and laser range finder 154 while pointing weapon system 200 towards a target 630. In such embodiments, the 9DOF sensor 120 may provide an X-Y-Z orientation of the target vector 620, the weapon location sensor(s) may provide a vector origin (e.g., a GPS origin) of the target vector 620, and the laser range finder 154 may provide a vector magnitude of the target vector 620. A single device (e.g., laser range finder 154) may provide both GPS and range data, and in such embodiments, the GPS/ranging device may provide both the vector origin and the vector magnitude of the target vector 620.

As detailed more fully below, a respective target vector 620 for each of a plurality of targets may be stored, such as in HUD 110 and/or TAK 410, to allow the shooter to quickly transition between targets. For instance, the current weapon vector may be compared against the stored target vector 620 of a selected target to indicate to the shooter where the selected target is located relative to the current weapon vector (i.e., to point the shooter to the selected target), as described in detail below.

Figure 7:
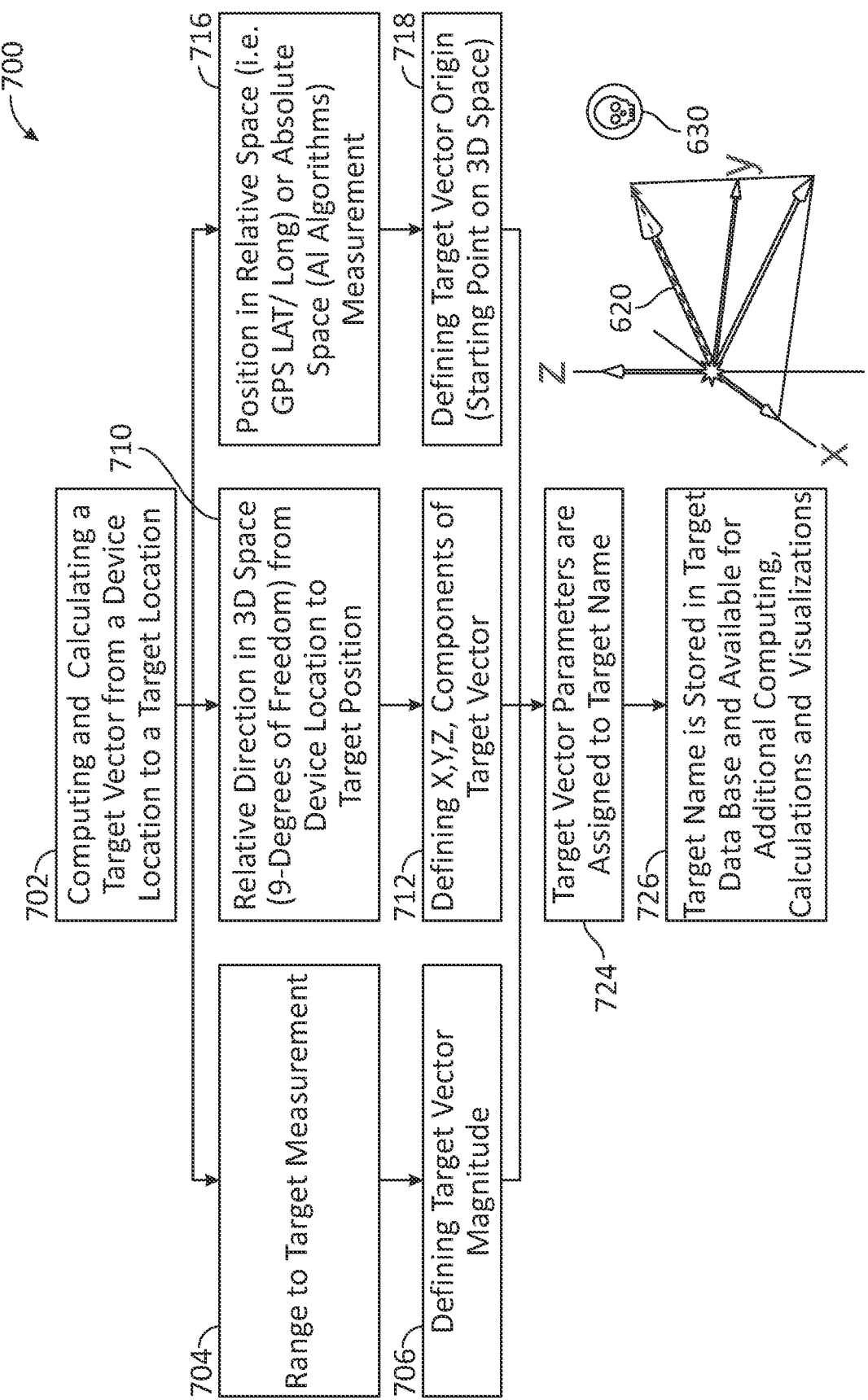
FIG. 7 illustrates a flowchart of a process of target vector acquisition, in accordance with an embodiment of the disclosure.

FIG. 7 illustrates a flowchart of a process 700 of target vector acquisition, in accordance with an embodiment of the disclosure. Any step, sub-step, sub-process, or block of process 700 may be performed in an order or arrangement different from the embodiments illustrated by FIG. 7. For example, one or more blocks may be omitted from or added to the process 700. Process 700 may be applied to any embodiment disclosed herein.

Process 700 may begin by computing and calculating a target vector from a device location to a target location (block 702). For example, target vector 620 may be calculated from the shooting position to target 630. The target vector may be computed and calculated using one or multiple sub-steps. For instance, block 704 includes measuring a range to target, with the range to target measurement used to define a target vector magnitude (block 706). Block 710 includes determining relative direction in 3D-space (e.g., 9 degrees of freedom) from device location to target position, with the relative direction used to define X, Y, Z components of the target vector in block 712. Block 716 includes measuring position in relative space (i.e., GPS LAT/LONG) and/or absolute space (AI algorithms, etc.), with the measurement(s) used to define target vector origin (i.e., starting point in 3D-space) in block 718.

In block 724, the target vector parameters are assigned to a target name (e.g., Echo, Foxtrot, etc.). In block 726, the target name and target vector parameters are stored in a target database. As detailed below, the target name/target vector parameters may be available for additional computing, calculations and visualizations, such as to point the shooter to a selected target.

Figure 8:
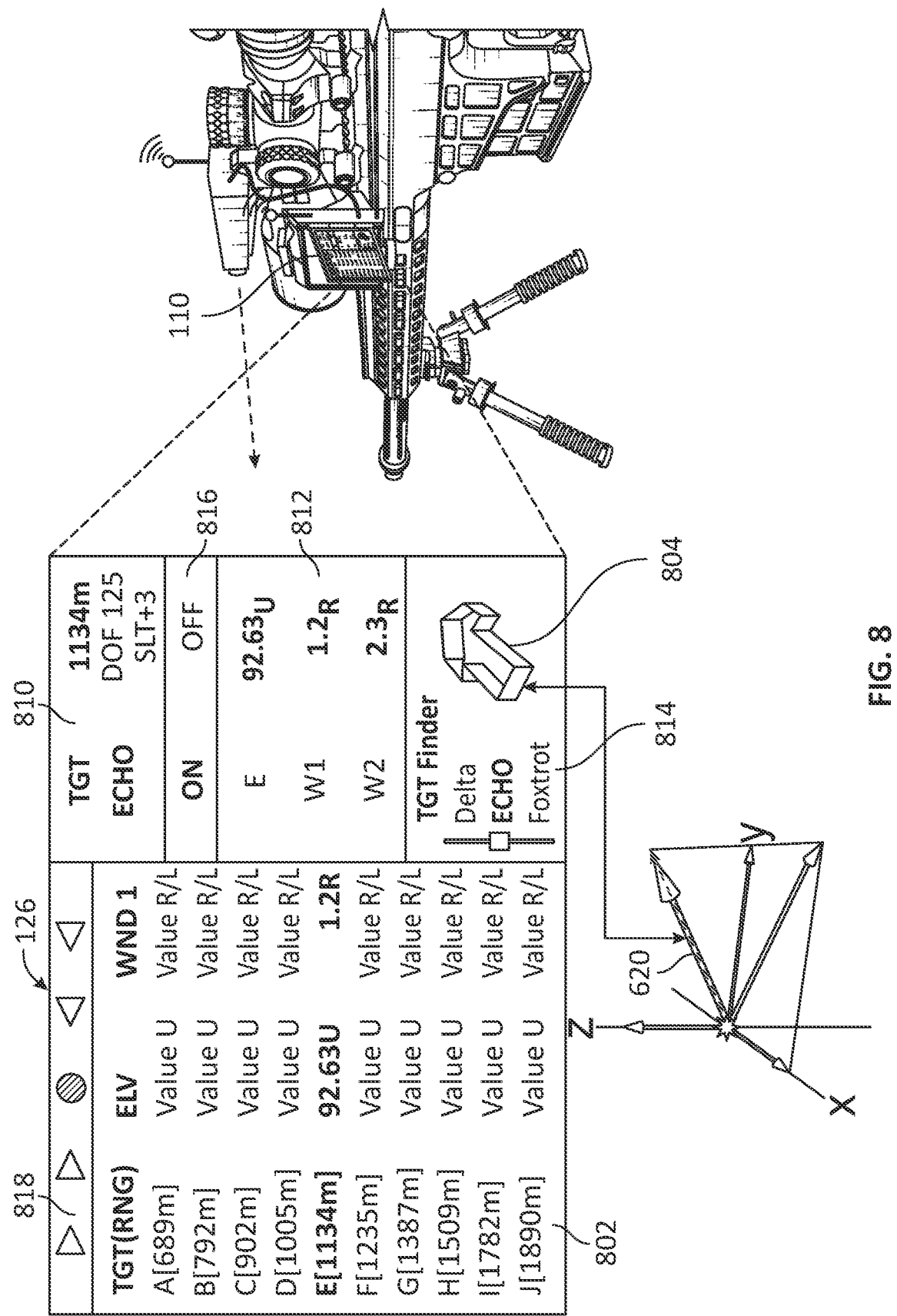
FIG. 8 illustrates a display of the HUD system of FIG. 2, in accordance with an embodiment of the disclosure.

FIG. 8 illustrates display 126 of HUD 110, in accordance with an embodiment of the disclosure. As shown, HUD 110 may include a target library 802 and a target finder visualization 804 visualized on display 126. The target library 802 may store respective ballistic information for each target of a plurality of targets. The respective ballistic information may include target name, range, elevation, and windage data, such as a ballistic solution (e.g., elevation and windage calculations) for a projectile fired from weapon system 200 to each target of the plurality of targets. In embodiments, the respective ballistic information may include target vector 620 for each target, the target vector 620 calculated based on data from at least one of the 9DOF sensor 120 or weapon location sensor(s), as explained above.

The target finder visualization 804 may be an active (e.g., live) visualization aid allowing the shooter to locate a selected target of the plurality of targets (i.e., an active target). For example, the target finder visualization 804 may include an animated live arrow pointing to the active target in relative 3D-space. In this regard, the target finder visualization 804 may be based on the target vector 620 of the active target. For example, the arrow may point along, or otherwise be aligned with, the target vector 620 of the active target to provide a visual cue to the shooter of where the active target is located. The shooter may manipulate the weapon system 200 until the arrow is aligned with the weapon vector 610 (i.e., the weapon system 200 is pointed at the active target).

The HUD 110 may display other information. For example, display 126 may include an active target parameters view 810, an active target ballistic solution view 812, a quick target selection view 814, a ready to engage target view 816, and an anti-cant interface view 818, or any combination thereof. The active target parameters view 810 may display target name, range, and target vector parameters for the active target. The active target ballistic solution view 812 may display the ballistic solution calculated for the active target (i.e., elevation and windage). The quick target selection view 814 may highlight the active target and allow the shooter to quickly select the previous or subsequent target in the target list. As detailed more fully below, the ready to engage target view 816 may display shooter indication of on or off target, such as whether the shooter is ready to engage the active target. The anti-cant interface view 818 may provide an indication of a cant of weapon system 200. For example, the anti-cant interface may indicate the weapon system 200 is canted left or right from vertical, as indicated by a virtual level.

As shown, the display 126 may be a split screen configured to simultaneously display the target library 802, the respective ballistic information of the selected target, and the target finder visualization 804, among other data. The display 126 may be user configurable to display or hide selected information or views, visually emphasize certain views over others, or place certain views in selected locations of display 126, among other customizations.

Figure 9A:
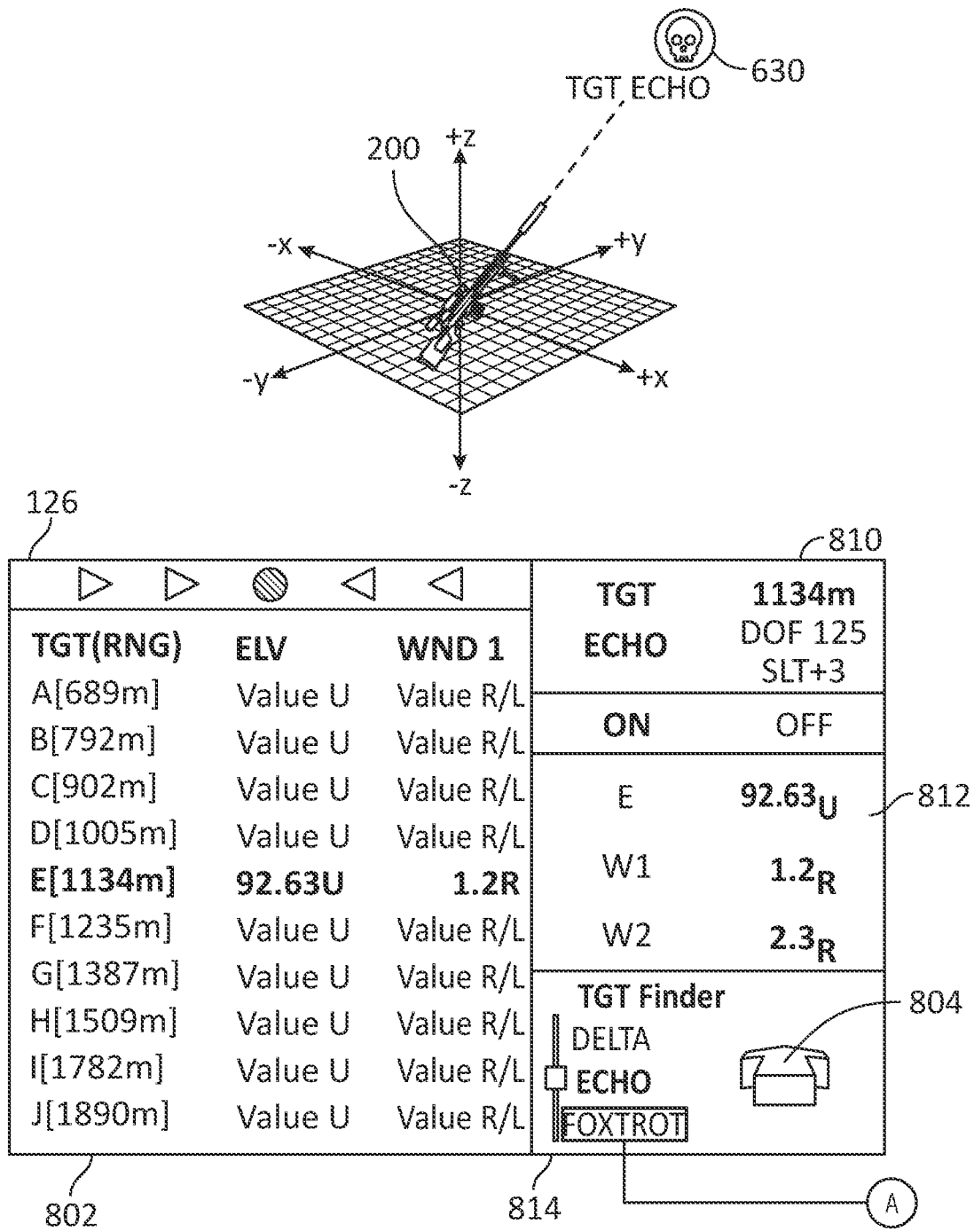
FIGS. 9A-9C illustrate 3D visualized guidance to a target, in accordance with an embodiment of the disclosure.
Figure 9B:
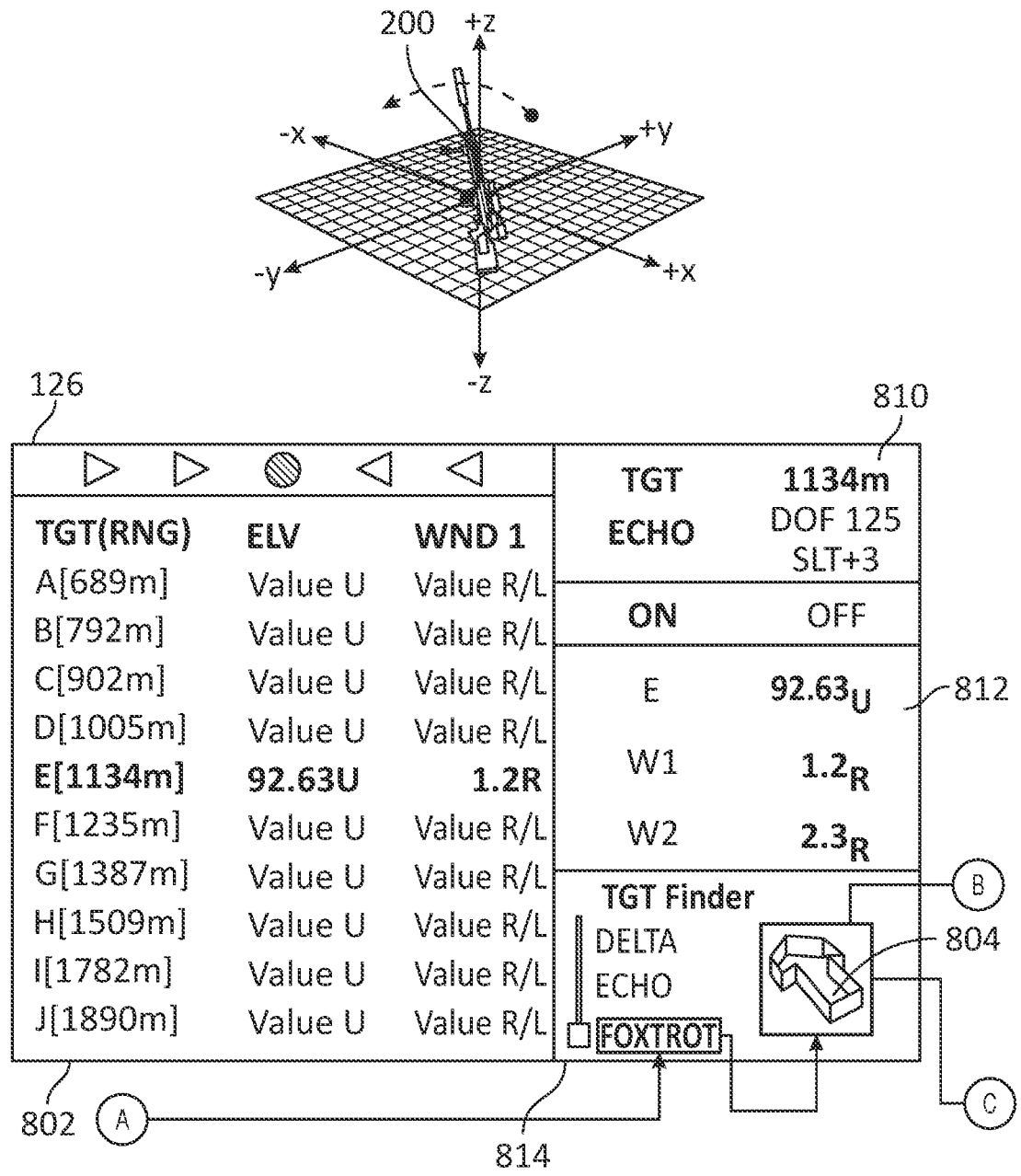
Figure 9C:
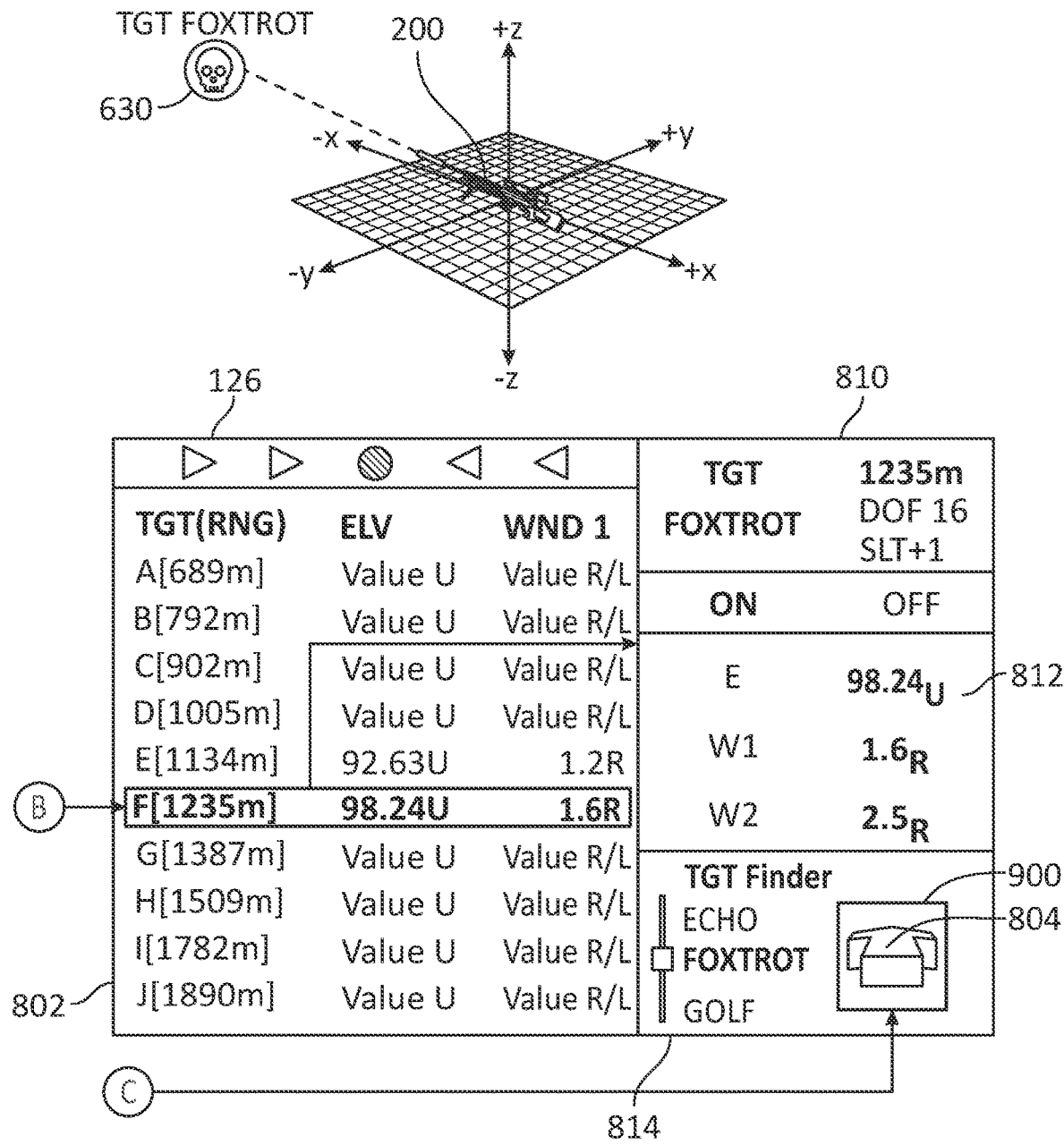
Figure 10A:
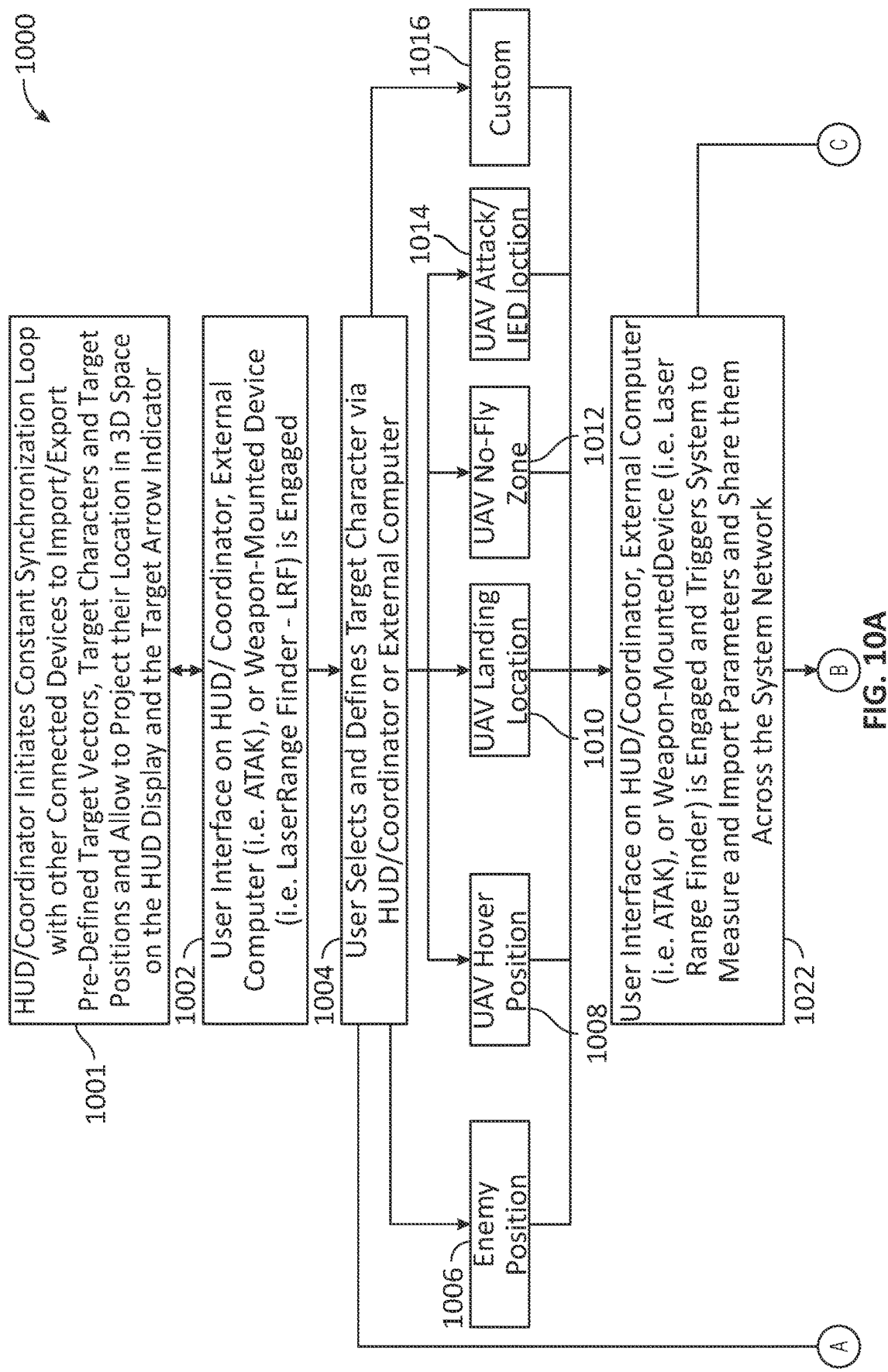
FIGS. 10A-10E illustrate a flowchart of a process of target acquisition, in accordance with an embodiment of the disclosure.
Figure 10B:
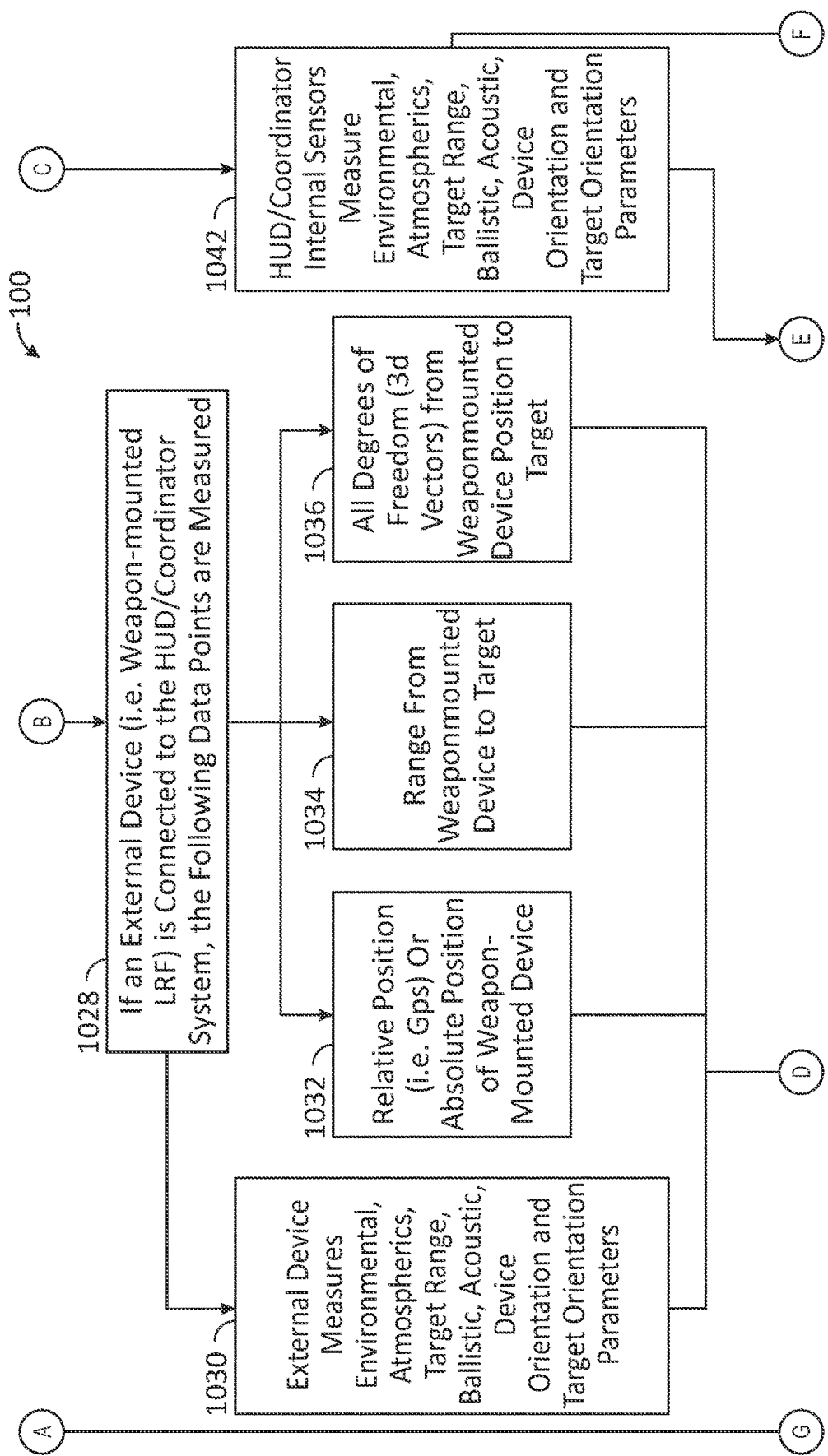
Figure 10C:
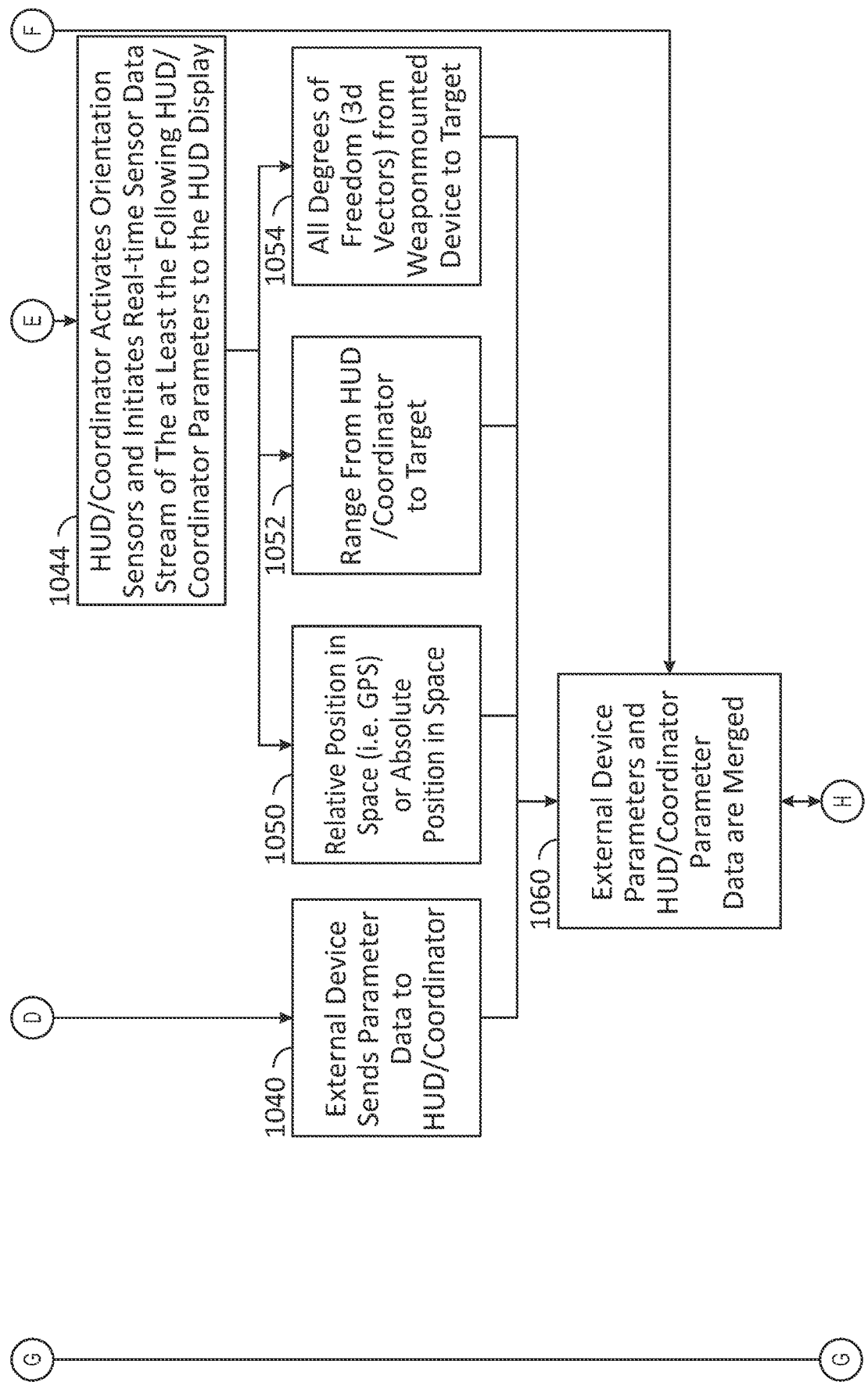
Figure 10D:
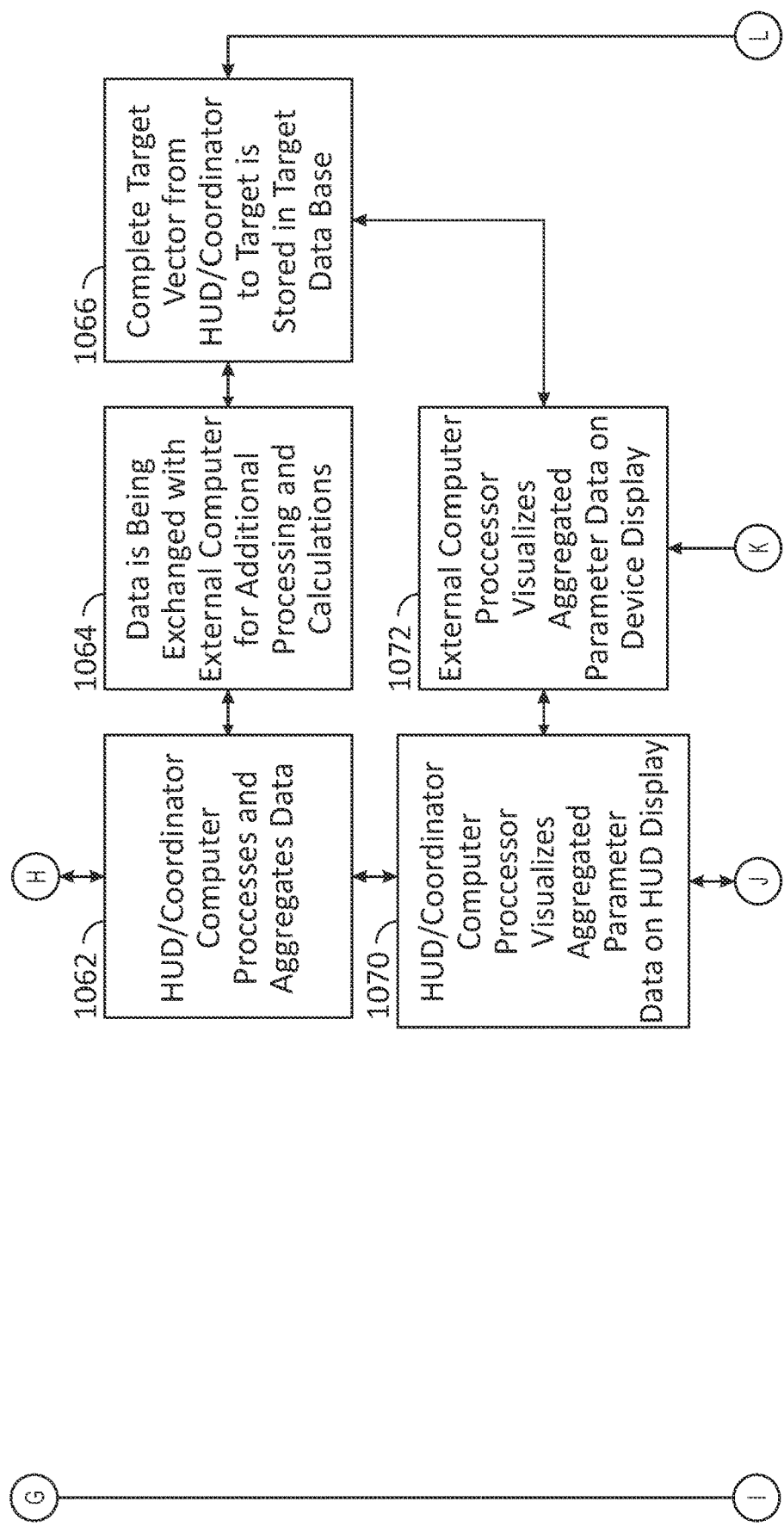
Figure 10E:
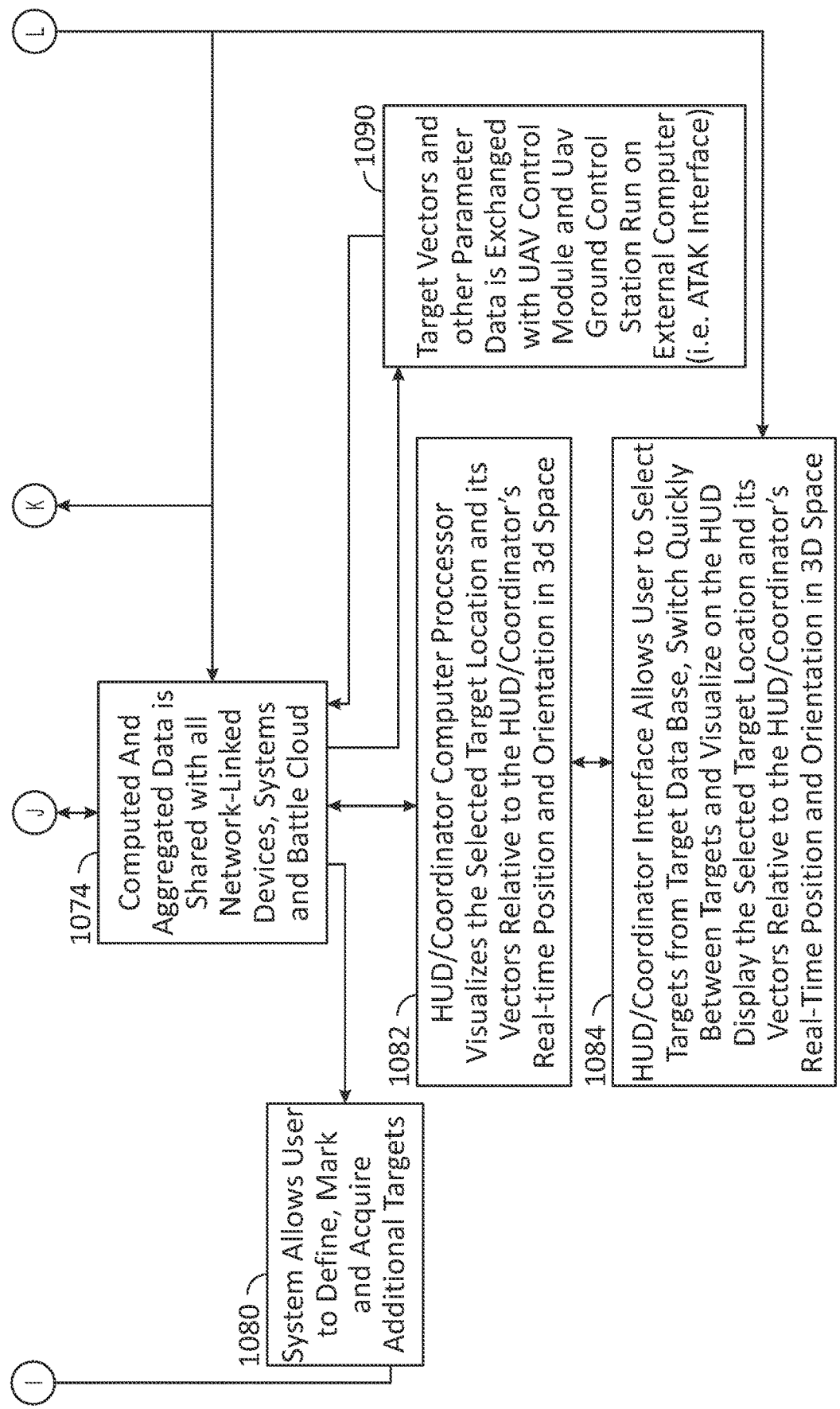

FIGS. 9A-9C illustrate 3D visualized guidance to a target, in accordance with an embodiment of the disclosure. FIGS. 9A-9C illustrate 3D visualized guidance from a first target (e.g., target ECHO) to a second target (e.g., target FOXTROT). Referring to FIG. 9A, the HUD 110 indicates that target ECHO is selected, as indicated in the target library 802, the active target parameters view 810, and the quick target selection view 814 of display 126. Target library 802 and active target parameters view 810 displays the range to target ECHO, active target parameters view 810 displays the target vector parameters for target ECHO, and target library 802 and active target ballistic solution view 812 displays the ballistic solution for target ECHO. As shown, the target finder visualization 804 indicates the weapon system 200 is aligned with the target vector to target ECHO.

Referring to FIG. 9B, the operator may select a target different than target ECHO, such as target FOXTROT, in quick target selection view 814 of display 126. When the different target is selected, the target finder visualization 804 may provide live feedback pointing to the newly selected target. For example, FIG. 9B indicates that target FOXTROT is now selected in quick target selection view 814, and target finder visualization 804 indicates that weapon system 200 needs to be moved up and to the left to align weapon vector with the target vector to target FOXTROT.

Referring to FIG. 9C, HUD 110 now indicates that target FOXTROT is selected, as indicated in the target library 802, the active target parameters view 810, and the quick target selection view 814 of display 126. Target library 802 and active target parameters view 810 displays the range to target FOXTROT, active target parameters view 810 displays the target vector parameters for target FOXTROT, and target library 802 and active target ballistic solution view 812 displays the ballistic solution for target FOXTROT. As shown, the target finder visualization 804 now indicates the weapon system 200 is aligned with the target vector to target FOXTROT, indicating the weapon system 200 is now on the previously marked target FOXTROT and ready to engage the target. In embodiments, an additional visualization may be provided to indicate weapon system 200 is aligned with the selected target. For example, a box, circle, or other alignment visualization 900 may appear around the target finder visualization 804 when weapon system 200 is in alignment. In embodiments, target finder visualization 804 and/or alignment visualization 900 may change appearance (e.g., color, pattern, etc.) based on alignment, such as having a first appearance (e.g., red, light, flashing, etc.) when weapon system 200 is out of alignment and having a second appearance (e.g., green, bold, steady, etc.) when weapon system 200 is in alignment.

FIGS. 10A-10E illustrate a flowchart of a process 1000 of target acquisition, in accordance with an embodiment of the disclosure. Any step, sub-step, sub-process, or block of process 1000 may be performed in an order or arrangement different from the embodiments illustrated by FIGS. 10A-10E. For example, one or more blocks may be omitted from or added to the process 1000. Process 1000 may be applied to any embodiment disclosed herein.

In block 1001, HUD 110 may initiate synchronization with other connected devices. For example, a constant synchronization may be initiated between HUD 110 and one or more connected devices (e.g., TAK 410) to import and/or export pre-defined target vectors, target characters, and target positions and allow to project their location in 3D-space on display 126 and target finder visualization 804.

In block 1002, a user interface on HUD 110, an external computer (e.g., TAK 410), or a weapon-mounted device (e.g., laser range finder 154) is engaged. The user interface may be a button, toggle, or switch, whether physically located on the device or virtually on display 126. In block 1004, the user selects and defines one or more target characteristics via the HUD 110 or external device. For example, the user may define an enemy position (block 1006), a UAV hover position (block 1008), a UAV landing location (block 1010), a UAV no-fly zone (block 1012), a UAV attack/IED location (block 1014), or any other custom characteristic (block 1016), such as via TAK 410.

In block 1022, the user interface may be engaged to trigger the system to measure and import target parameters. The target parameters may be shared across the system network, such as between various devices of the system (e.g., external LRF, HUD 110, etc.). If an external device (e.g., a weapon mounted LRF) is connected to the HUD 110, the system may measure various data points (block 1028). For example, the external device may measure environmental, atmospherics, target range, ballistic, acoustic, device orientation and target orientation parameters (block 1030). In block 1032, the relative or absolute position of the weapon-mounted device may be determined. In block 1034, the range from the weapon-mounted device to target may be determined. In block 1036, all degrees of freedom (e.g., 3D vectors) from the weapon-mounted device position to target are determined. In block 1040, the external device sends the parameter data to HUD 110.

Alternatively, HUD internal sensors may measure environmental, atmospherics, target range, ballistic, acoustic, device orientation and target orientation parameters (block 1042). In such embodiments, HUD 110 may activate one or more orientation sensors and initiate a real-time sensor data stream of one or more HUD parameters, such as to display 126 (block 1044). For instance, relative or absolute position of HUD 110 in space (block 1050), range from HUD 110 to target (block 1052), and all degrees of freedom (e.g., 3D vectors) from HUD 110 to target (block 1054) may be determined.

In block 1060, the external device parameters and the HUD parameter data are merged. For example, HUD 110 may process and aggregate the data in block 1062. In block 1064, data may be exchanged with an external computer (e.g., TAK 410) for additional processing and calculations. In block 1066, the complete target vector from HUD 110 to target may be stored in a target database (e.g., target library 802).

In block 1070, HUD 110 may visualize the aggregated parameter data on display 126. Depending on the application, an external computer (e.g., TAK 410) may visualize the aggregated parameter data on a device display (block 1072). In block 1074, computed and aggregated data is shared with all network-linked devices, systems and battle cloud.

In block 1080, the system may allow the user to define, mark and acquire additional targets, such as a plurality of targets. In such embodiments, process 1000 may return to block 1004, in which the user selects and defines one or more target characteristics.

In block 1082, HUD 110 may visualize the selected target location and its vectors relative to the HUD 110 in real-time position and orientation in 3D-space. In block 1084, a HUD interface may allow the user to select targets from a target database, switch quickly between targets and visualize, on display 126, the selected target location and its vectors relative to the HUD's real-time position and orientation in 3D-space.

Process 1000 may include additional features. For example, in block 1090, target vectors and other parameter data may be exchanged with a UAV system, such as with a UAV control module and/or a UAV ground control station ran on an external computer (e.g., TAK 410).

Figure 11:
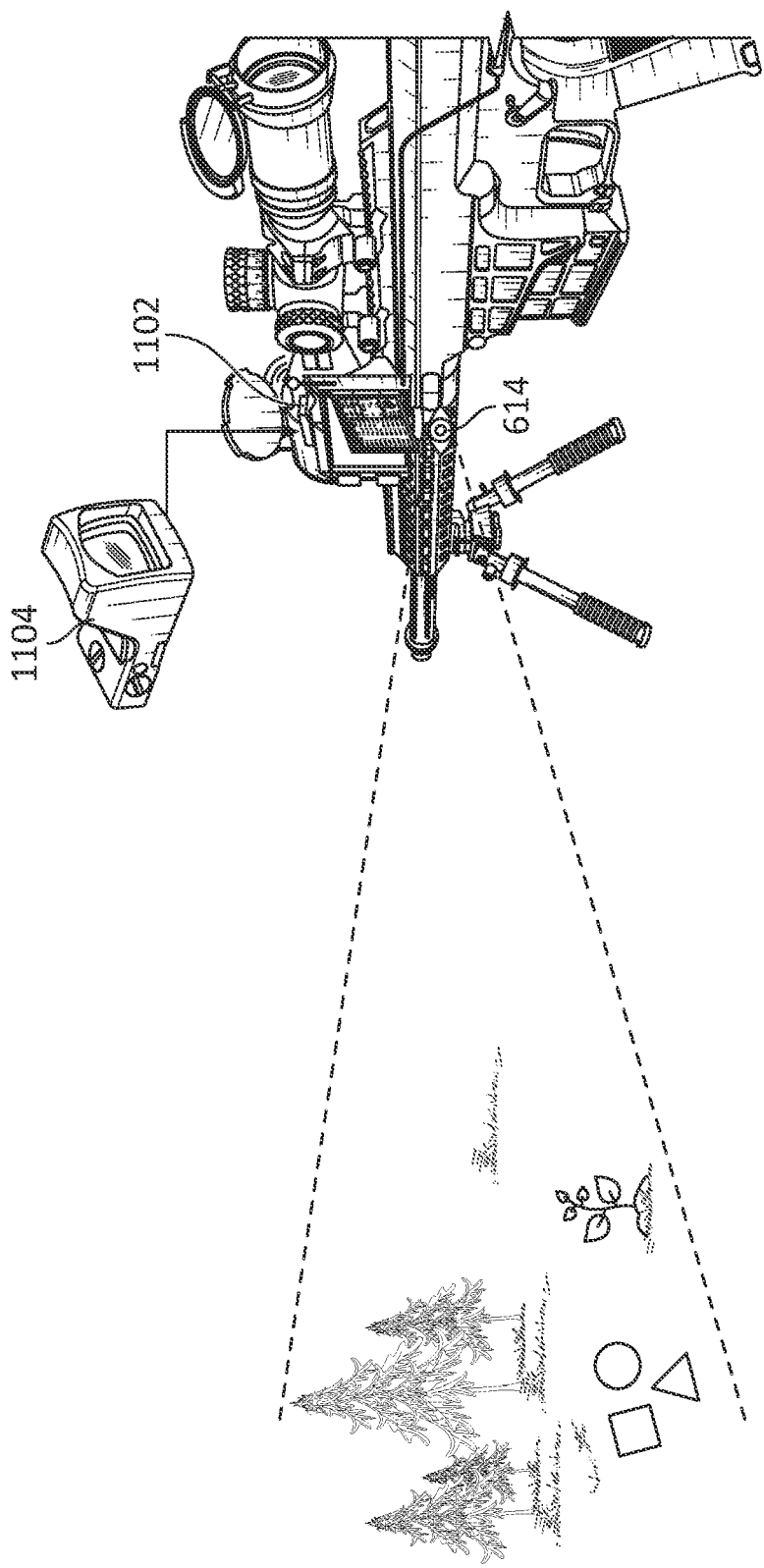
FIG. 11 illustrates additional functionality of HUD or weapon system, in accordance with an embodiment of the disclosure.

FIG. 11 illustrates additional functionality of HUD 110 and/or weapon system 200, in accordance with an embodiment of the disclosure. Referring to FIG. 11, HUD 110 may include environmental mapping, such as via second weapon location sensor 614. For instance, HUD 110 may include artificial intelligence (AI) algorithms in addition to environmental mapping sensors (e.g., computer vision, LIDAR, ultrasonic, sensor fusion, etc.) to facilitate orientation in GPS-enabled and GPS-denied environments. In some embodiments, HUD 110 may include an adapter rail 1102 for mounting one or more accessories to HUD 110, such as a red dot or other close quarter battle (CQB) optics 1104. In such embodiments, the adapter rail 1102 may mount the optics 1104 aligned with the shooter's eye position when firing weapon system 200.

Figure 12:
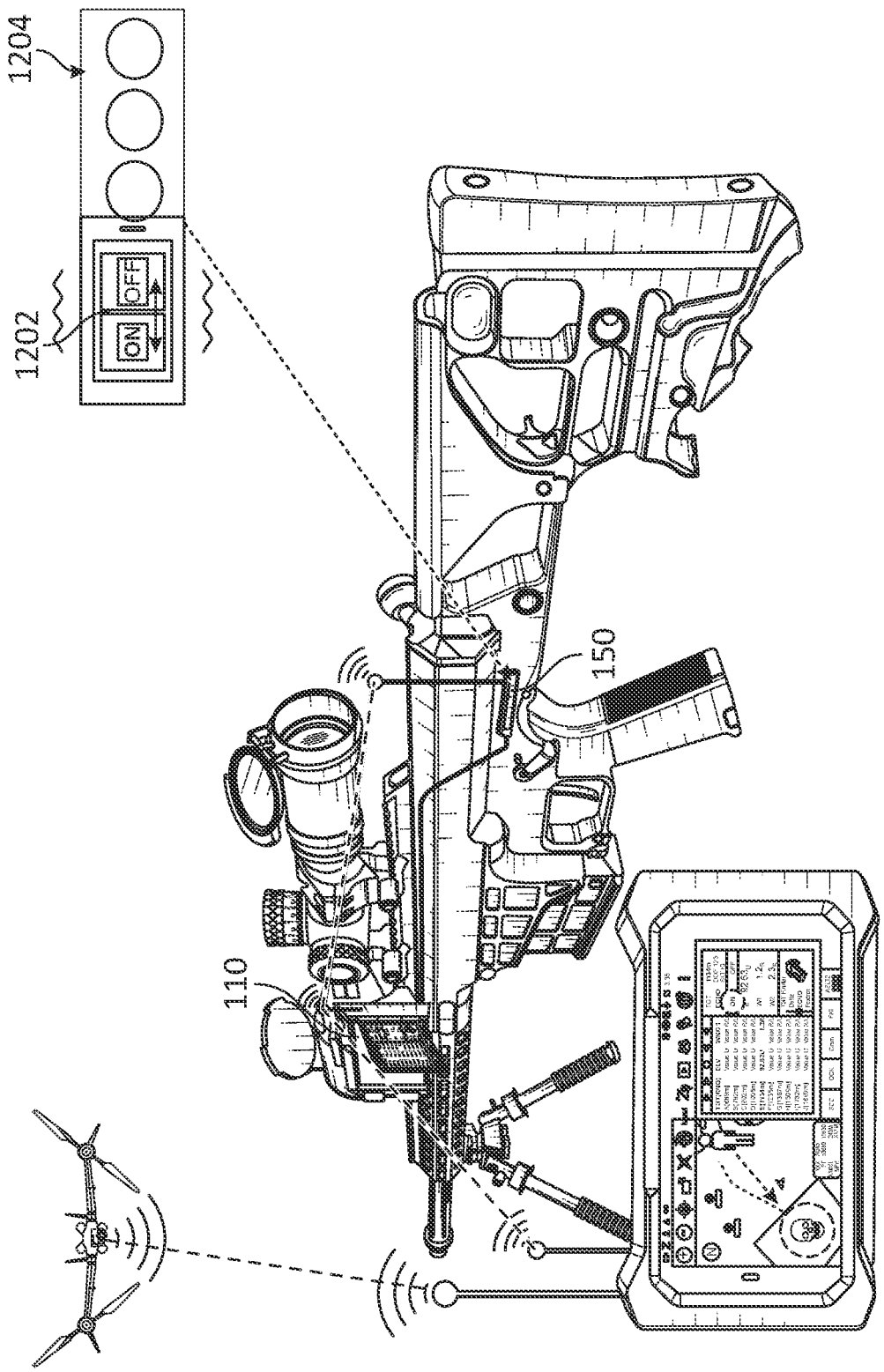
FIG. 12 illustrates an engagement determination of the HUD system of FIG. 4, in accordance with an embodiment of the disclosure.

FIG. 12 illustrates an engagement determination using HUD 110, in accordance with an embodiment of the disclosure. Referring to FIGS. 8 and 12, remote 150 may be operable to provide an indication of on or off target, such as visualized in ready to engage target view 816 of HUD 110. For example, remote 150 may include a switch 1202 to toggle between "on target" or "off target." When "on target," the operator may have target in view and be ready to fire on the target. When "off target," the operator may not have target in view or not be ready to fire on the target. In embodiments, the switch 1202 may include a vibration feature to confirm switch position. As shown, remote 150 may include other buttons 1204 to navigate the HUD functions. For example, the operator may select a target from the target list and/or otherwise control HUD 110 via buttons 1204.

With continued reference to FIG. 12, HUD 110 may announce a ready to engage the active/selected target and share such information via a communication ecosystem. For example, the ready to engage status of the operator may be shared with a TAK ecosystem, such as for coordinated sniper fire with other operators or units (e.g., other sniper units), commanded by a tactical decisionmaker.

Figure 13:
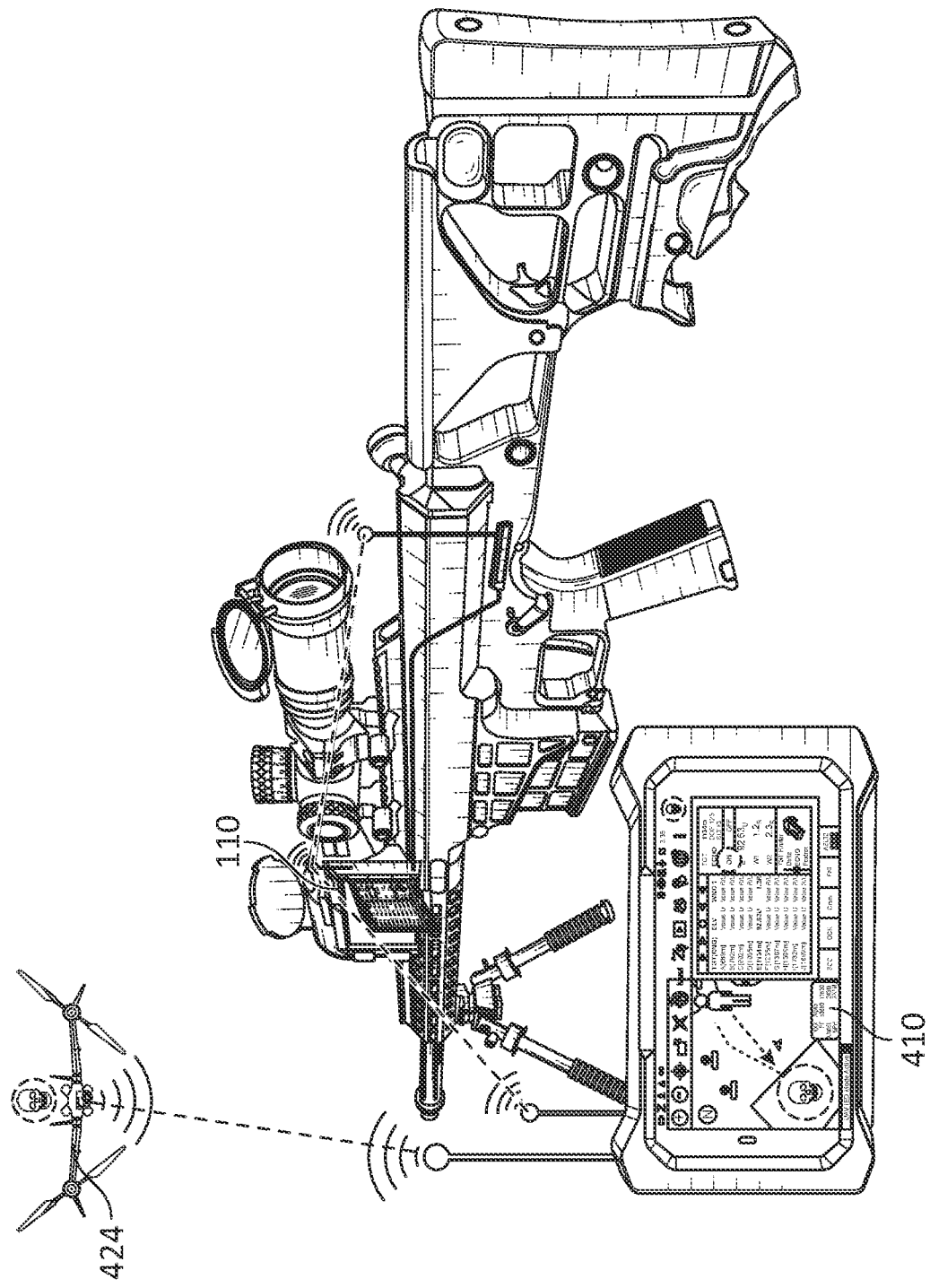
FIG. 13 illustrates a UAV destruction and/or engagement application, in accordance with an embodiment of the disclosure.

FIG. 13 illustrates a UAV destruction and/or engagement application, in accordance with an embodiment of the disclosure. Referring to FIG. 13, HUD 110 and/or TAK 410 may be configured to direct UAV destruction and/or UAV engagement of a target. For example, HUD 110 and/or TAK 410 may initiate a UAV improvised explosive device (IED) mode, using TAK target data and/or HUD active target parameters to assign a target to UAV 424 and trigger a UAV-IED detonation at designated location. In some embodiments, an operator can manually pilot UAV 424 into a target via TAK remote control or HUD 110 using a point of view guidance application and live view UAV feed.

Figure 14:
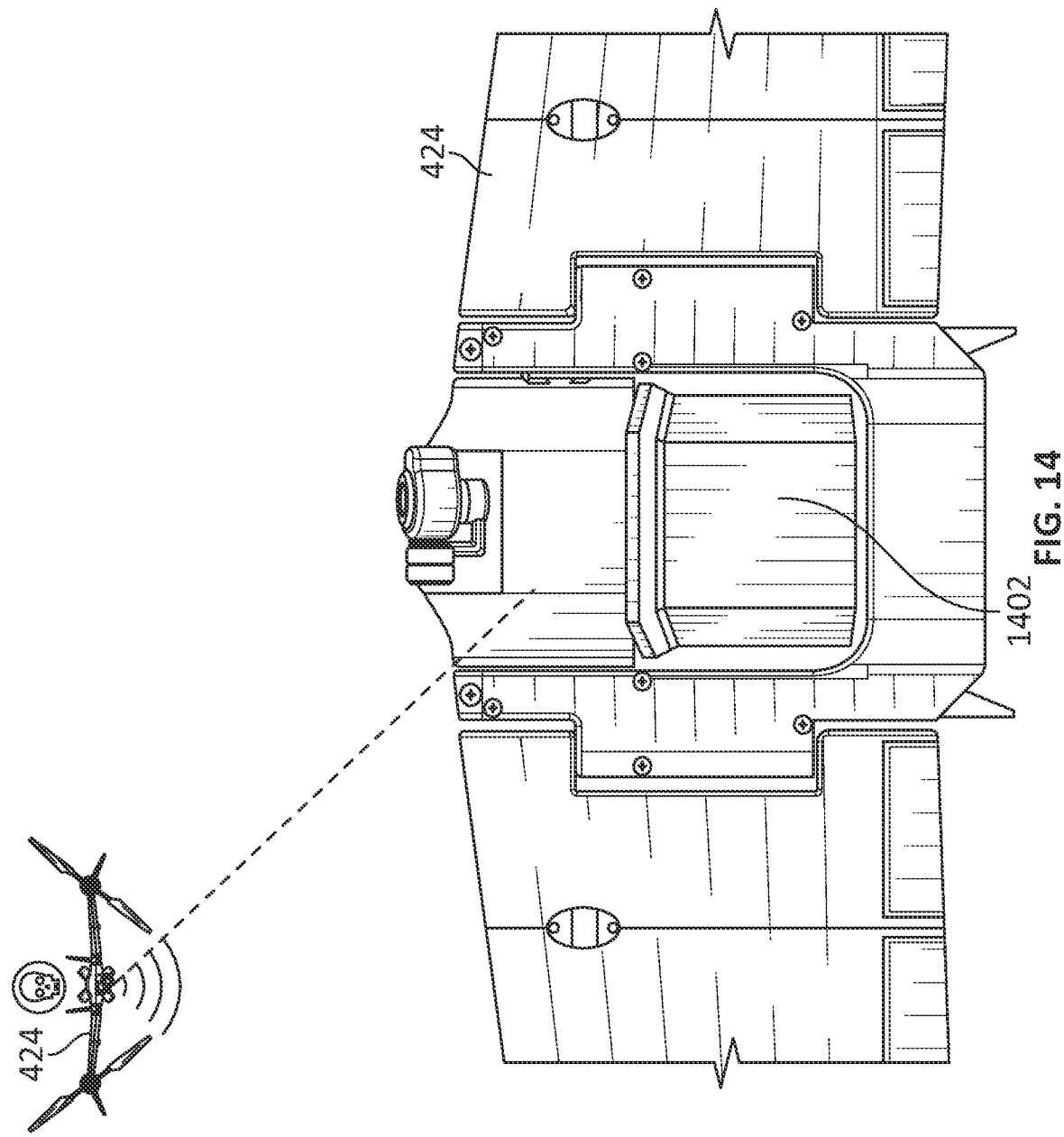
FIG. 14 illustrates a destruction payload of a UAV, in accordance with an embodiment of the disclosure.
Figure 15:
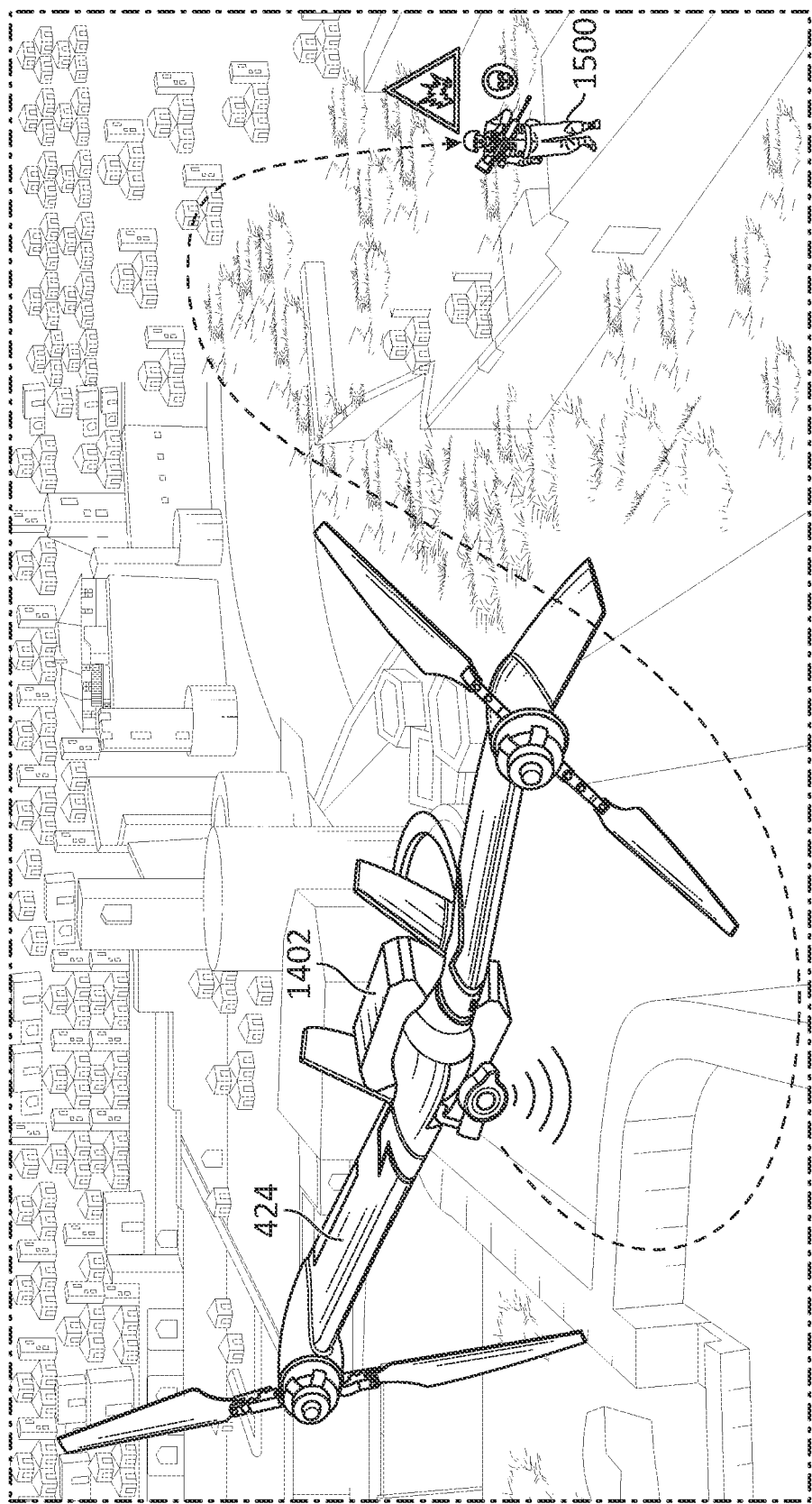
FIG. 15 illustrates use of a UAV to engage a target, in accordance with an embodiment of the disclosure.
Figure 16:
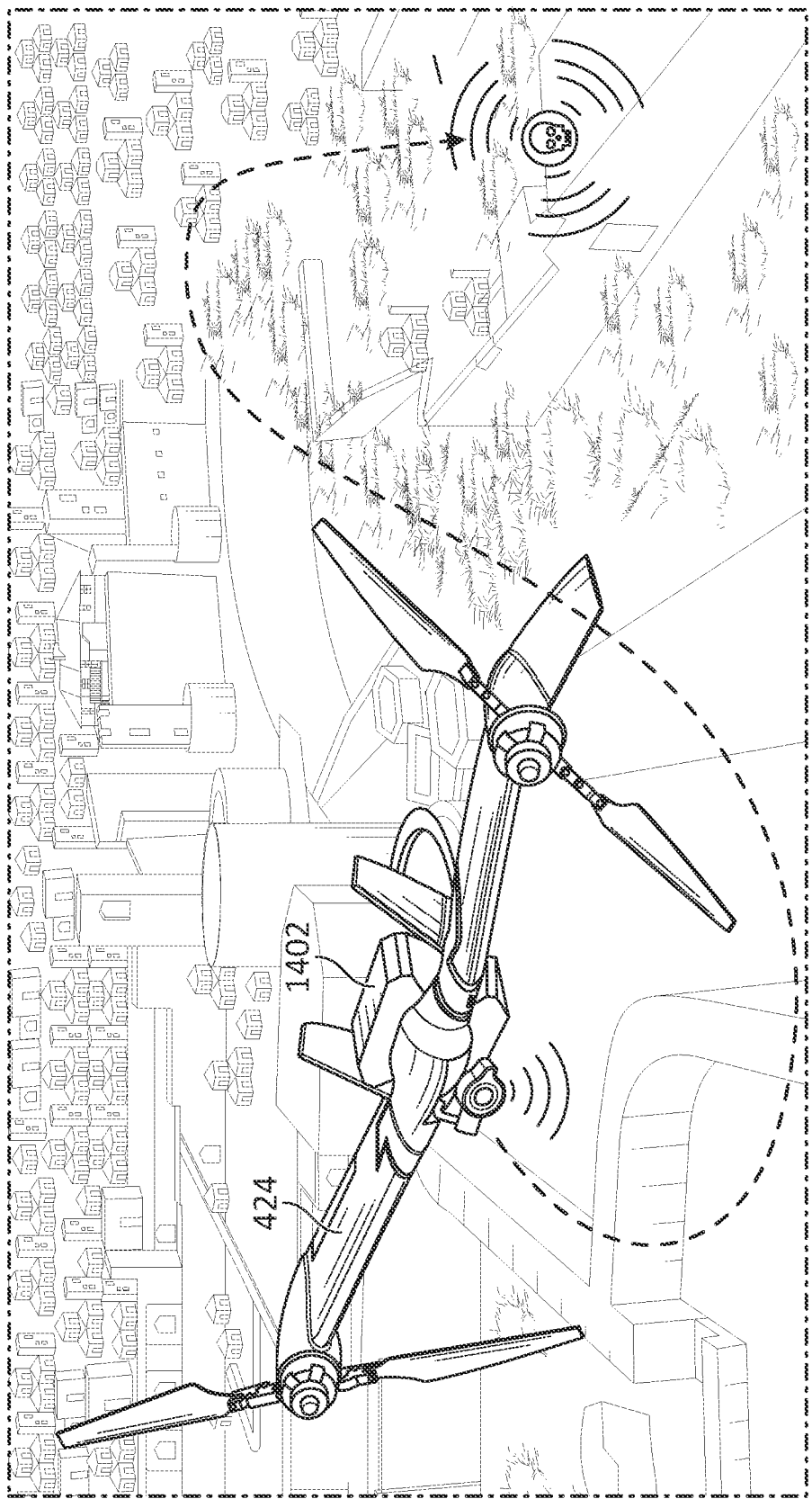
FIG. 16 illustrates use of a UAV as an improvised explosive device or a static intelligence, surveillance, and reconnaissance device, in accordance with an embodiment of the disclosure.

FIG. 14 illustrates a destruction payload of UAV 424, in accordance with an embodiment of the disclosure. FIG. 15 illustrates use of UAV 424 to engage a target, in accordance with an embodiment of the disclosure. FIG. 16 illustrates use of UAV 424 as an improvised explosive device or a static intelligence, surveillance, and reconnaissance (ISR) device, in accordance with an embodiment of the disclosure. Referring to FIGS. 13-16, UAV 424 may include a nano-charge, a phosphor ignition system, an electrical short circuit mechanism, an explosive charge, or other destruction or weapons application/system 1402. For example, UAV 424 may include explosives, grenades, and/or gas containers (e.g., CS gas) as a payload. As shown in FIG. 15, an operator may fly or otherwise command UAV 424 (e.g., via HUD 110 and/or TAK 410) into an enemy target 1500 and trigger the explosive charge 1402 either physically (e.g., impact trigger), via sensors (e.g., heat, proximity, face ID, AI trigger, etc.), or remotely (e.g., via HUD 110 and/or TAK 410). As shown in FIG. 16, an operator may fly UAV 424 to a designated position, land and hide the UAV 424, and use the UAV 424 as an IED triggered in a similar manner. In some embodiments, the UAV 424 may be flown and landed in a designated position to function as an ISR device.

Figure 17:
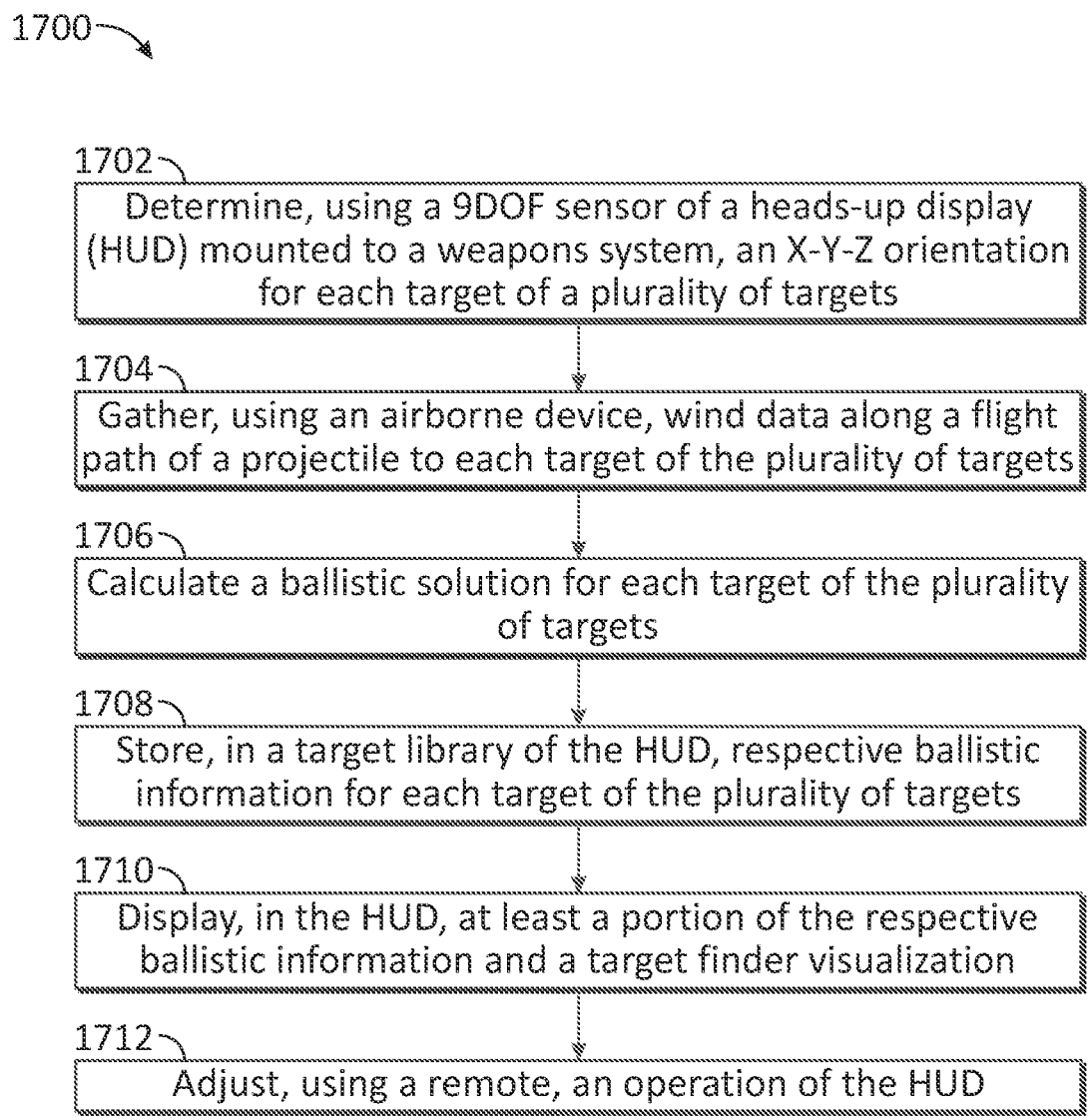
FIG. 17 illustrates a flowchart of a method of displaying ballistic information and target location via a HUD, in accordance with an embodiment of the disclosure.

FIG. 17 illustrates a flowchart of a method 1700 of displaying ballistic information and target location via a HUD (e.g., HUD 110 described above), in accordance with an embodiment of the disclosure. Method 1700 is illustrated as a set of operations or steps and is described with reference to FIGS. 1-16, although method 1700 may be applied to other embodiments not illustrated in FIGS. 1-16. One or more steps that are not expressly illustrated in FIG. 17 may be included before, after, in between, or as part of the illustrated steps.

In block 1702, method 1700 includes determining, using a 9 degrees of freedom (9DOF) sensor of a HUD mounted to a weapon system, an X-Y-Z orientation for each target of a plurality of targets. For example, the 9DOF sensor may include a gyroscope, an accelerometer, and a magnetometer to capture nine distinct types of motion or orientation-related data of a weapon system (e.g., a sniper rifle system). The 9DOF sensor may define X, Y, and Z components of a weapon vector defining the orientation of weapon system.

In block 1704, method 1700 may include gathering, using an airborne device, wind data along a flight path of a projectile to a target (e.g., to a selected target, to each target of the plurality of targets). For example, one or more airborne devices may be deployed, either manually or automatically, along the flight path to gather wind data, such as described in U.S. patent application Ser. No. 16/822,925, now U.S. Pat. No. 10,866,065, the disclosure of which is hereby incorporated by reference in its entirety.

In block 1706, method 1700 may include calculating a ballistic solution for a target (e.g., a selected target). Block 1706 may include calculating a ballistic solution for each target of the plurality of targets. For example, based on received or gathered environmental data, a ballistic computer may calculate a wind compensation value and/or elevation compensation value for a projectile fired from the weapon system to hit a desired target. The wind compensation value may account for horizontal drift of the projectile at target distance. The elevation compensation value may account for vertical drop of the projectile at the target distance. The wind and elevation compensation values may be determined by the ballistic calculator using conventional ballistic calculations, using any number of factors. For example, along with distance, projectile velocity, wind data, temperature, atmospheric pressure, humidity, and altitude, or any combination thereof, the ballistic computer may account for shooting position and target location (e.g., slant angle measurements, Coriolis Effect, etc.) as well as other factors (e.g., spin drift, powder temperature, zero conditions, etc.). The wind and elevation compensation values may be determined through a mathematical or algorithmic calculation.

In block 1708, method 1700 includes storing, in a target library of the HUD, respective ballistic information for each target of the plurality of targets. The respective ballistic information may include the ballistic solution and a target vector for each target of the plurality of targets. The target vector may be based on the determined X-Y-Z orientation. For example, the weapon vector may be used to define the target vector as the weapon system is pointed towards each target.

In block 1710, method 1700 includes displaying, in the HUD, at least a portion of the respective ballistic information and a target finder visualization. The target finder visualization may be based on the target vector and point to a selected target of the plurality of targets. The target finder visualization may include an animated live arrow pointing to the selected target in relative 3D-space. Block 1710 may include simultaneously displaying the target library, the respective ballistic information of the selected target, and the target finder visualization (e.g., via a split screen of a display of HUD).

In block 1712, method 1700 may include adjusting an operation of the HUD based on a signal received from a remote. For example, a display setting, a communication setting, an operation mode, a functionality, or the like may be adjusted based on a user input at a remote. In embodiments, remote may provide an indication to HUD of the shooter being "on target" or "off target," as explained above. When "on target," the shooter may have target in view and be ready to fire on the target. When "off target," the shooter may not have target in view or not be ready to fire on the target. In embodiments, the remote may allow the shooter to select a target from a target list, switch between targets in the target list, modify the target list, or the like.

All relative and directional references (including up, down, upper, lower, top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A tactical system comprising:
a first heads-up display (HUD) system mountable to a first weapon, the first HUD system comprising:
one or more sensors configured to provide position and orientation data associated with the first weapon;
a processor configured to calculate a target position of a target based at least in part on the position and orientation data associated with the first weapon; and
a communications module configured to communicate the target position over a communications network; and
a second HUD system mountable to a second weapon, the second HUD system comprising:
one or more sensors configured to provide position and orientation data associated with the second weapon;
a communications module configured to import the target position from the communications network; and
a processor configured to:
calculate a position and an orientation of the second weapon based on the position and orientation data associated with the second weapon;
calculate a target vector based at least in part on the imported target position and the position of the second weapon; and
generate a target finder visualization based at least in part on the target vector and the orientation of the second weapon.

2. The tactical system of claim 1, further comprising:
a tactical computer configured to:
connect to the communications network; and
store a target database comprising target positions received via the communications network from a plurality of networked devices and to synchronize the target database with the second HUD system.

3. The tactical system of claim 1, wherein the target finder visualization comprises an animated symbol configured to point to the target in relative 3D-space from a perspective of the second weapon.

4. The tactical system of claim 1, wherein the second HUD system further comprises a remote configured to cause the communications module to provide an indication of on target or off target via the communications network.

5. The tactical system of claim 1, wherein the one or more sensors of the first HUD system comprise a ranging device configured to provide a range to the target from the first HUD system.

6. The tactical system of claim 1, further comprising an airborne device configured to gather wind data along the target vector and to transmit the wind data via the communications network.

7. The tactical system of claim 1, wherein the communications module of the first HUD system and the communications module of the second HUD system are configured to communicate wirelessly with the communications network.

8. The tactical system of claim 1, wherein the second HUD system is configured to display a ballistic solution for the target including windage and elevation calculations.

9. The tactical system of claim 8, wherein the second HUD system is configured to display the ballistic solution and the target finder visualization simultaneously.

10. A tactical system comprising:
a tactical computer configured to store a target database; and
a heads-up display (HUD) system mountable to a weapon, the HUD system comprising:
one or more sensors configured to provide position and orientation data;
a communications module configured to exchange information with the tactical computer over a communications network; and
a processor configured to:
calculate a position and an orientation of the weapon based on the position and orientation data from the one or more sensors;
calculate a target position of a first target based at least in part on the orientation of the weapon;
export the target position of the first target to the tactical computer via the communications module;
import a target position of a second target from the tactical computer via the communications module;
calculate a target vector based at least in part on the imported target position and the position of the weapon; and
generate a target finder visualization based at least in part on the target vector and the orientation of the weapon.

11. The tactical system of claim 10, wherein the target database comprises target positions received via the communications network from a plurality of networked devices including the HUD system.

12. The tactical system of claim 10, wherein the target finder visualization comprises an animated symbol configured to point to the second target in relative 3D-space from a perspective of the weapon.

13. The tactical system of claim 10, wherein the HUD system further comprises a remote configured to cause the communications module to provide an indication of on target or off target via the communications network.

14. The tactical system of claim 10, wherein the one or more sensors of the HUD system comprise a ranging device configured to provide a range to the first target from the HUD system.

15. The tactical system of claim 10, further comprising an airborne device configured to gather wind data along the target vector and to transmit the wind data via the communications network.

16. The tactical system of claim 10, wherein the communications module is configured to communicate wirelessly with the communications network.

17. The tactical system of claim 10, wherein the HUD system is configured to display a ballistic solution for the second target including windage and elevation calculations.

18. The tactical system of claim 17, wherein the HUD system is configured to display the ballistic solution and the target finder visualization simultaneously.

19. A method comprising:
calculating a position and an orientation of a weapon based on position and orientation data from one or more sensors of a HUD system mounted to a weapon;
calculating a target position of a first target based at least in part on the orientation of the weapon;
exporting the target position of the first target to a tactical computer via a communications module of the HUD system;
importing a target position of a second target from the tactical computer via the communications module;
calculating a target vector based at least in part on the imported target position and the position of the weapon; and
generating a target finder visualization based at least in part on the target vector and the orientation of the weapon.

20. The method of claim 19, further comprising:
receiving the target position of the second target at the tactical computer from a second HUD system mounted to a second weapon.

* * * * *